(12) United States Patent
Kibe et al.

(10) Patent No.: US 11,520,312 B2
(45) Date of Patent: Dec. 6, 2022

(54) METHOD OF CONTROLLING MOTOR CONTROL APPARATUS

(71) Applicants: KABUSHIKI KAISHA YASKAWA DENKI, Kitakyushu (JP); Yaskawa America, Inc., Waukegan, IL (US)

(72) Inventors: Yasushi Kibe, Kitakyushu (JP); William Phillips, Waukegan, IL (US); Christopher Jaszczolt, Waukegan, IL (US); Micah Stuedemann, Waukegan, IL (US)

(73) Assignees: KABUSHIKI KAISHA YASKAWA DENKI, Kitakyushu (JP); YASKAWA AMERICA, INC., Waukegan, IL (US)

( * ) Notice: Subject to any disclaimer, the term of this patent is extended or adjusted under 35 U.S.C. 154(b) by 177 days.

(21) Appl. No.: 16/891,065

(22) Filed: Jun. 3, 2020

(65) Prior Publication Data
US 2020/0356079 A1    Nov. 12, 2020

Related U.S. Application Data

(62) Division of application No. 14/946,818, filed on Nov. 20, 2015, now Pat. No. 10,712,728.

(51) Int. Cl.
*G05B 19/4155* (2006.01)
*H02P 27/06* (2006.01)

(52) U.S. Cl.
CPC .......... *G05B 19/4155* (2013.01); *H02P 27/06* (2013.01); *G05B 2219/34418* (2013.01)

(58) Field of Classification Search
CPC ...... G05B 19/4155; G05B 2219/34418; H02P 27/06
See application file for complete search history.

(56) References Cited

U.S. PATENT DOCUMENTS 5,578,913 A    11/1996    Yasuda et al.
5,931,070 A    8/1999    Miyajima et al.
(Continued)

FOREIGN PATENT DOCUMENTS

JP    63-80854    4/1988
JP    2003-61388    2/2003
(Continued)

OTHER PUBLICATIONS

Japanese Office Action for corresponding JP Application No. 2016-217908, dated Apr. 11, 2017.
(Continued)

*Primary Examiner* — Walter H Swanson
(74) *Attorney, Agent, or Firm* — Mori & Ward, LLP

(57) ABSTRACT

A method of controlling a motor control apparatus includes selecting one of a first option and a first additional option in a first setting item in response to a first user input via a setting sequence prior to a control-mode-finding sub-process of the setting sequence, the first setting item relating to a motor and including the first option and the first additional option, the first option being different from the first additional option. A first control mode is selected in the control-mode-finding sub-process via the setting sequence based on the first option selected in the first setting item prior to the control-mode-finding sub-process. A second control mode is selected in the control-mode-finding sub-process via the setting sequence based on the first additional option selected in the first setting item prior to the control-mode-finding sub-process. The first control mode is different from the first option and the first additional option.

8 Claims, 32 Drawing Sheets

(56) References Cited

U.S. PATENT DOCUMENTS

| | | | |
|---|---|---|---|
| 2002/0007487 A1 | 1/2002 | Matsumoto et al. | |
| 2010/0067935 A1 | 3/2010 | Nakamura | |
| 2013/0331956 A1 | 12/2013 | Kasuya | |
| 2015/0073582 A1 | 3/2015 | Fukumoto | |
| 2017/0179869 A1* | 6/2017 | Sekiguchi | H02P 23/14 |
| 2017/0265703 A1 | 9/2017 | Park | |

FOREIGN PATENT DOCUMENTS

| | | |
|---|---|---|
| JP | 2009-291072 | 12/2009 |
| JP | 2010-72226 | 4/2010 |
| JP | 2012-150758 | 8/2012 |
| WO | WO 2014/181615 | 11/2014 |

OTHER PUBLICATIONS

"YASKAWA AC Drive-V1000 Compact Vector Control Drive", Installation & Start-Up Manual, Apr. 2007, XP055361769, https://www.yaskawa.com/, URL: http://www.caipe.com/docs/var_v1000-installation.pdf.

"Sigma II Series Servo System User's Manual (Chapter 7—Using the Digital Operator)", Sep. 2009, pp. 275-330, XP055362888, URL: https://www.yaskawa.com/delegate/getAttachment?documentId=YEA-SIA-S800-32.2&cmd=documents&documentName=YEA-SIA-S800-32.2.pdf&web_access=Public.

Extended European Search Report for corresponding EP Application No. 16199610.3-1806, dated Apr. 20, 2017.

Japanese Office Action for corresponding JP Application No. 2016-217908, dated Sep. 12, 2017 (w/ English machine translation).

"Yaskawa inverter V1000 small vector control technical manual" Yaskawa Electric data No. SIJP C710606 16H, Oct. 2016, Japan.

"Yaskawa inverter V1000 small vector control quick start guide" Yaskawa Electric data No. TOJP C710606 12I, Mar. 2014, Japan.

Japanese Office Action for corresponding JP Application No. 2018-003628, dated Dec. 18, 2018 (w/English machine translation).

European Office Action for corresponding EP Application No. 16199610.3, dated May 7, 2020.

Non-Final Office Action issued by the U.S. Patent and Trademark Office for the parent U.S. Appl. No. 14/946,818, filed Feb. 28, 2018.

Applicant-Initiated Interview Summary with Form PTO-892 Notice of References Cited issued by the U.S. Patent and Trademark Office for the parent U.S. Appl. No. 14/946,818, filed Mar. 9, 2018.

Final Office Action issued by the U.S. Patent and Trademark Office for the parent U.S. Appl. No. 14/946,818, filed Jul. 26, 2018.

Advisory Action issued by the U.S. Patent and Trademark Office for the parent U.S. Appl. No. 14/946,818, filed Oct. 30, 2018.

Non-Final Office Action issued by the U.S. Patent and Trademark Office for the parent U.S. Appl. No. 14/946,818, filed Jan. 23, 2019.

Restriction Requirement issued by the U.S. Patent and Trademark Office for the parent U.S. Appl. No. 14/946,818, filed Jul. 9, 2019.

Final Office Action issued by the U.S. Patent and Trademark Office for the parent U.S. Appl. No. 14/946,818, filed Nov. 14, 2019.

Notice of Allowance issued by the United States Patent and Trademark Office for the parent U.S. Appl. No. 14/946,818, filed Mar. 3, 2020.

* cited by examiner

FIG. 5

| CURRENTLY SELECTED ITEM | SELECTED OPTION | PREVIOUSLY SELECTED OPTION | AVAILABLE USER INPUT CR1 | | | |
|---|---|---|---|---|---|---|
| | | | U12 | U11 | U13 | U14 |
| | | | ↓ | ↑ | ← | → |
| SI1 | OP11 | | F1 | ENTER | | |
| | OP12 | | HOME | SI2 | – | OP12 |
| | OP13 | | HOME | SI2 | OP11 | OP13 |
| SI2 | OP21 | | HOME | SI2 | OP12 | – |
| | OP22 | OP11/OP12 | SI1 | SI3 | – | OP22 |
| | | OP13 | SI1 | SI3 | OP21 | – |
| SI3 | OP31 | | SI2 | SI7 | – | – |
| | OP32 | | SI2 | SI4 | OP31 | OP32 |
| | OP33 | | SI2 | SI4 | OP32 | OP33 |
| | | | SI2 | SI4 | | – |

| CR2 ||
|---|---|
| SETTING ITEM | MESSAGE |
| SI1 | M1 |
| SI2 | M2 |
| SI3 | M3 |
| SI4 | M4 |
| SI5 | M5 |
| SI6 | M6 |
| SI7 | M7 |
| SI8 | M8 |
| SI9 | M9 |
| SI10 | M10 |
| SI11 | M11 |
| SI12 | M12 |
| SI13 | M13 |

FIG. 8

METHOD OF CONTROLLING MOTOR CONTROL APPARATUS

CROSS-REFERENCE TO RELATED APPLICATIONS

The present application is a divisional application of U.S. patent application Ser. No. 14/946,818, filed Nov. 20, 2015. The contents of this application are incorporated herein by reference in their entirety.

BACKGROUND OF THE INVENTION

Field of the Invention

The present invention relates to a method of controlling the motor control apparatus.

Discussion of the Background

For example, Japanese published unexamined application 2009-291072 describes a system to control a motor.

SUMMARY OF THE INVENTION

According to one aspect of the present invention, a method of controlling a motor control apparatus includes selecting one of a first option and a first additional option in a first setting item in response to a first user input via a setting sequence prior to a control-mode-finding sub-process of the setting sequence, the first setting item relating to a motor and including the first option and the first additional option, the first option being different from the first additional option. A first control mode is selected in the control-mode-finding sub-process via the setting sequence based on the first option selected in the first setting item prior to the control-mode-finding sub-process. A second control mode is selected in the control-mode-finding sub-process via the setting sequence based on the first additional option selected in the first setting item prior to the control-mode-finding sub-process. The first control mode is different from the first option and the first additional option. The second control mode is different from the first control mode, the first option, and the first additional option.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a table showing a correspondence relationship between setting items and a user input.

FIG. 8 is a table showing a correspondence relationship between setting items and messages.

DESCRIPTION OF THE EMBODIMENTS

Figure 1:
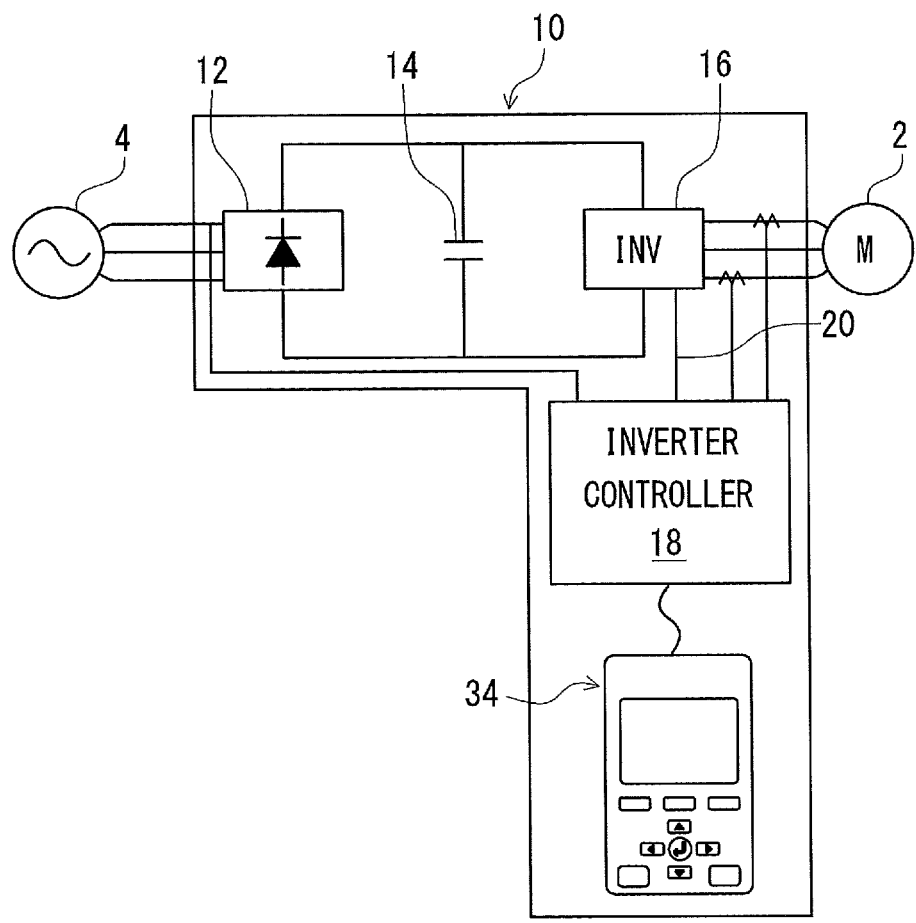
FIG. 1 is a schematic diagram showing an outline of a motor control apparatus according to a first embodiment.

The embodiments will now be described with reference to the accompanying drawings, wherein like reference numerals designate corresponding or identical elements throughout the various drawings.

First Embodiment

Referring initially to FIG. 1, a motor control apparatus 10 in accordance with a first embodiment is configured to control a motor 2. Examples of the motor 2 can include an induction motor and a permanent magnet motor. However, the motor control apparatus 10 can be configured to control any type of motor. The motor control apparatus 10 includes a converter 12, a smoothing capacitor 14, an inverter 16, and an inverter controller 18. The converter 12 is configured to be electrically connected to an alternating-current (AC) power source 4. The inverter 16 is configured to be electrically connected to the motor 2.

As seen in FIG. 1, the converter 12 and the smoothing capacitor 14 convert AC power supplied from the AC power source 4 into direct-current (DC) power. The inverter 16 changes the DC power supplied from the converter 12 and the smoothing capacitor 14 into AC power. The inverter 16 outputs the changed AC power to the motor 2. Structures of the converter 12, the smoothing capacitor 14, and the inverter 16 have been known in the motor control field. Thus, they will not be described and/or illustrated in detail here for the sake of brevity.

The inverter controller 18 is operatively connected to the inverter 16. In this embodiment, the inverter controller 18 is electrically connected to the inverter 16 via a cable 20.

Figure 2:
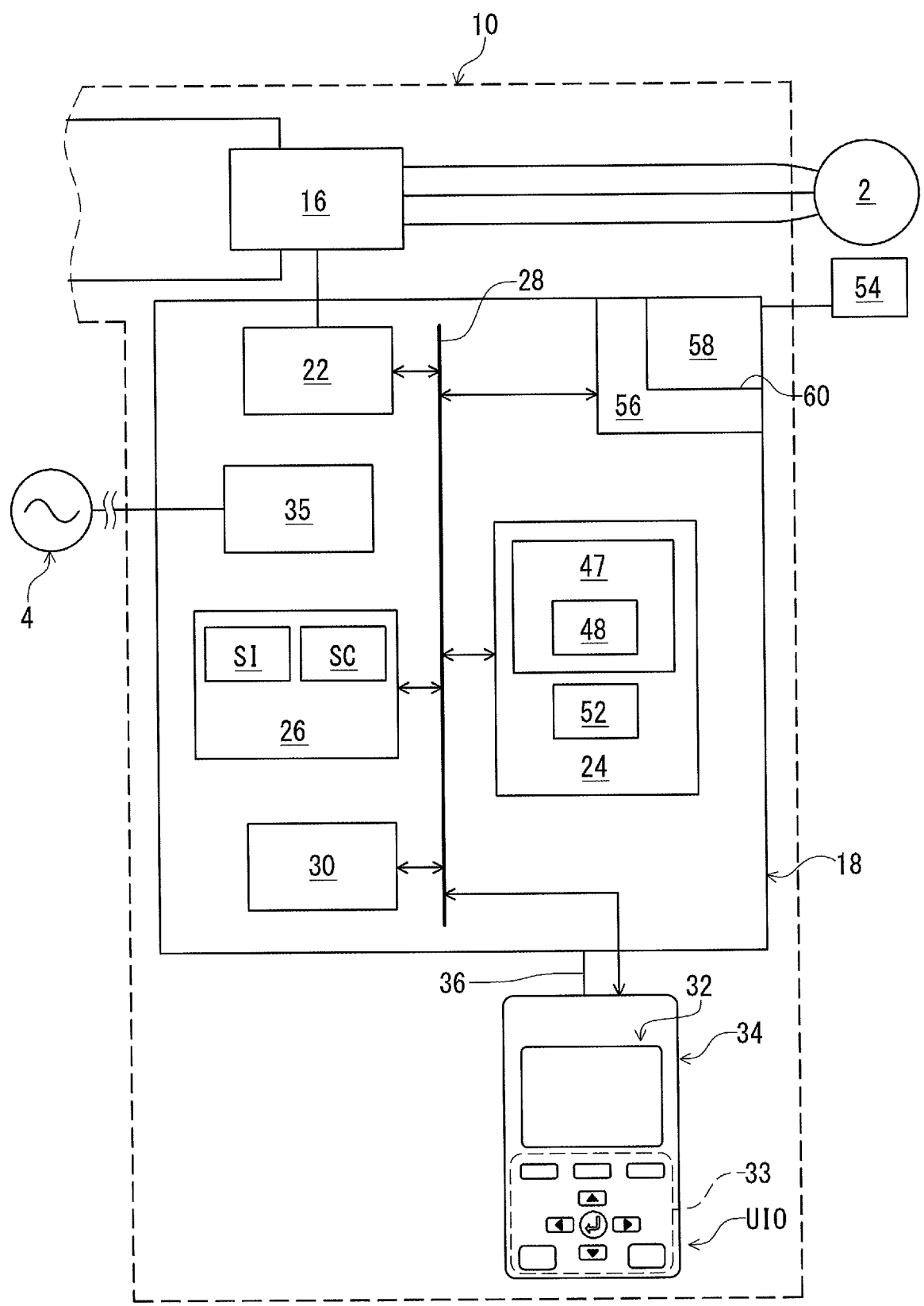
FIG. 2 is a schematic block diagram of an inverter controller of the motor control apparatus illustrated in FIG. 1.

As seen in FIG. 2, the inverter controller 18 includes a control signal generator 22 configured to generate a control signal to control rotation of the motor 2 via the inverter 16. The control signal generator 22 includes components such as a pulse-width-modulation (PWM) controller and a voltage controller. The control signal generator 22 performs V/f control and/or vector control to control the motor 2.

The motor control apparatus 10 manages setting items each relating to the motor 2. The setting items will be described in detail later. The motor control apparatus 10 allows the user to adjust control parameters and/or control modes to control the motor 2. Specifically, the inverter controller 18 includes a processor 24, a memory 26, and a system bus 28. The processor 24 includes a central processing unit (CPU) and a memory controller. The processor 24 is electrically connected to the control signal generator 22 and the memory 26 via the system bus 28. The processor 24, the memory 26, and the system bus 28 are electrically mounted on a substrate, for example. The processor 24, the memory 26, the system bus 28, and the substrate constitute a circuit to perform functions of the motor control apparatus 10.

The memory 26 includes a read only memory (ROM) and a random access memory (RAM). The ROM includes a non-transitory computer-readable storage medium. The RAM includes a transitory computer-readable storage medium. The memory 26 includes storage areas each having an address in the ROM and the RAM. The processor 24 controls the memory 26 to store data in the storage areas of the memory 26 and reads data from the storage areas of the memory 26.

At least one program is stored in the memory 26 (e.g., the ROM). The at least one program is read into the processor 24, and thereby functions of the motor control apparatus 10 are performed.

The motor control apparatus 10 further includes a display controller 30 and a display 32. The display controller 30 controls the display 32 to display information. The motor control apparatus 10 further includes an input device 33. The input device 33 receives a user input UI0. In this embodiment, the motor control apparatus 10 includes an operation device 34. The display 32 and the input device 33 are provided in the operation device 34. However, the display 32 and/or the input device 33 can be provided in the inverter controller 18.

The motor control apparatus 10 includes a power controller 35. The power controller 35 is electrically connected to the AC power source 4. The power controller 35 controls electric power supplied from the AC power source 4 to the control signal generator 22, the processor 24, the memory 26, the display controller 30, the display 32, and the input device 33. The power controller 35 supplies the controlled electric power to the operation device 34 via a cable 36.

In this embodiment, the electric power is supplied from the AC power source 4 to the inverter controller 18 and the operation device 34 via the power controller 35. However, electric power can be supplied from other power source to the inverter controller 18 and the operation device 34 via the power controller 35 or other power controller.

Figure 3:
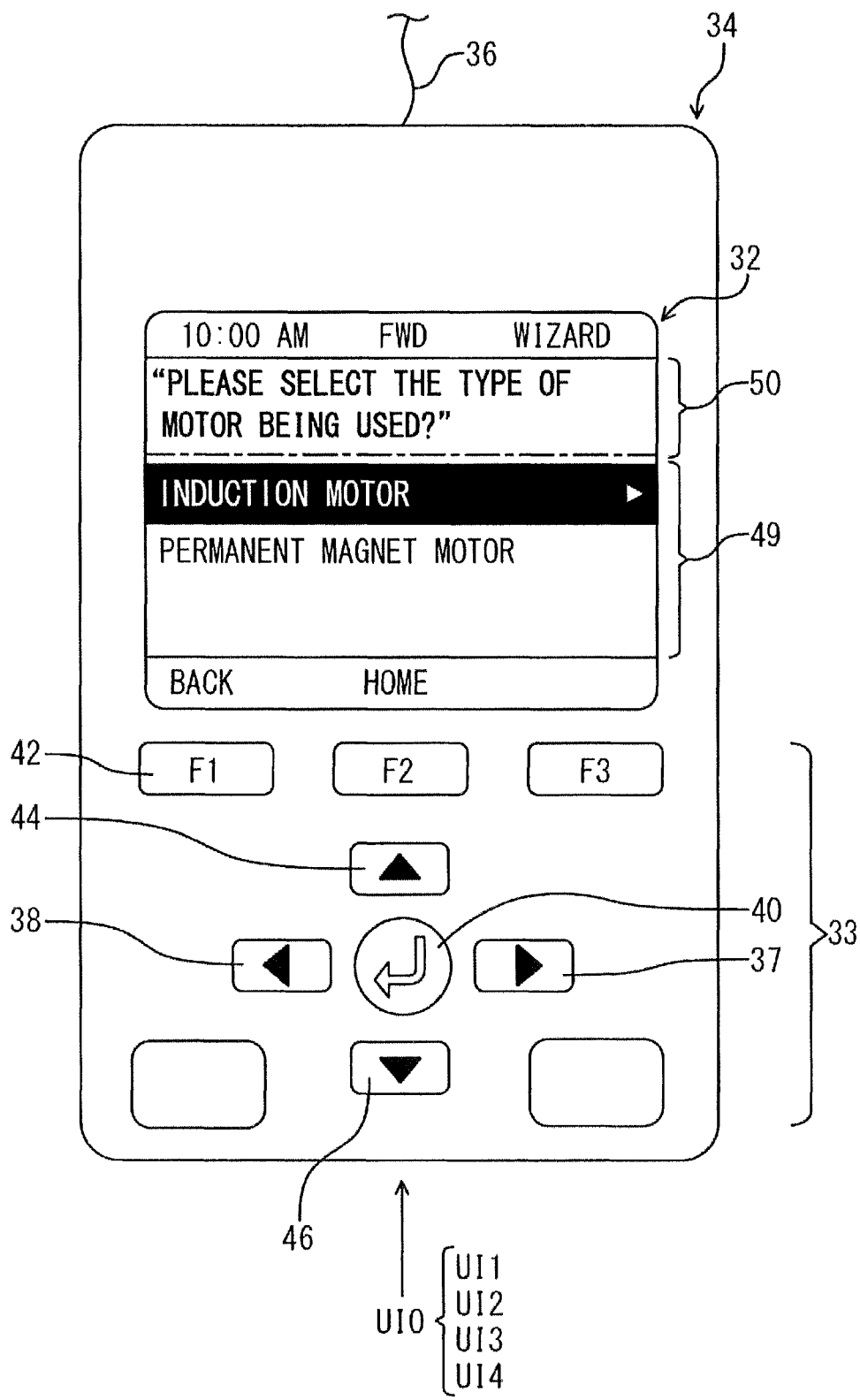
FIG. 3 shows a display and an input device of the motor control apparatus illustrated in FIG. 1.

As seen in FIG. 3, the user input UI0 includes a forward input UI1 and a backward input UI2. In this embodiment, the input device 33 includes a first arrow key 37 to receive the forward input UI1, and a second arrow key 38 to receive the backward input UI2. The first arrow key 37 includes a right arrow key. The second arrow key 38 includes a left arrow key. However, the forward input UI1 and the backward input UI2 can be received by other keys.

The input device 33 includes a first key 40 to receive the forward input UI1, and a second key 42 to receive the backward input UI2. In this embodiment, the first key 40 includes an enter key to set information. The second key 42 includes a function key (F1). However, the first key 40 and the second key 42 can be omitted from the input device 33. Furthermore, the input device 33 can include keys other than the first key 40 and the second key 42.

In this embodiment, the user input UI0 includes an upward input UI3 and a downward input UI4. The input device 33 includes a third arrow key 44 and a fourth arrow key 46. The third arrow key 44 includes an up arrow key to receive the upward input UI3. The fourth arrow key 46 includes a down arrow key to receive the downward input UI4.

Information relating to the motor 2 is displayed on the display 32. The user can perform settings of control of the motor 2 via the display 32 and the input device 33.

As seen in FIG. 2, the memory 26 is configured to store setting items SI each relating to the motor 2. In this embodiment, the setting items SI include control parameters of the motor 2 and control modes of the motor 2. However, the setting items SI are not limited to the control parameters and the control modes.

The memory 26 is configured to store a setting sequence SC to sequentially set the setting items SI. In this embodiment, the setting sequence SC defines an order of setting the setting items SI.

Figure 4:
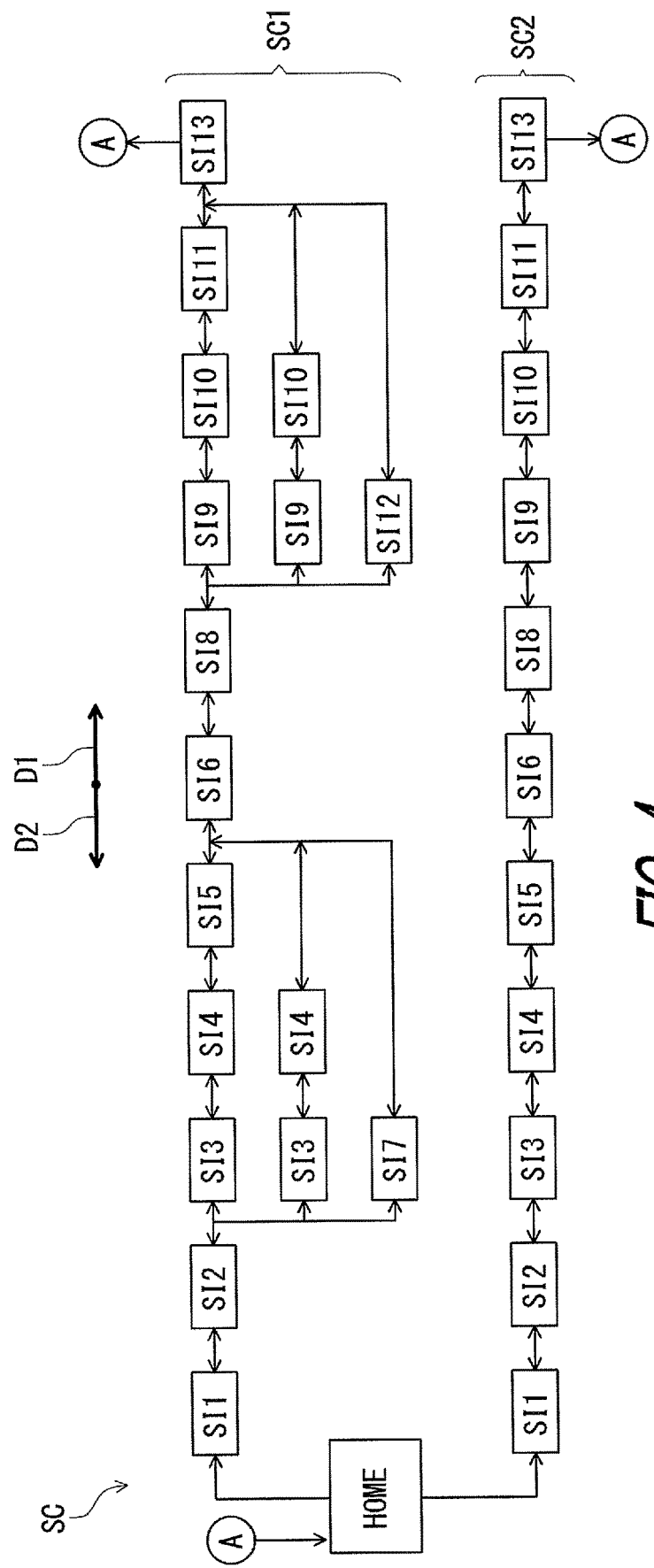
FIG. 4 shows examples of a setting sequence of the motor control apparatus illustrated in FIG. 1.

FIG. 4 illustrates one example of the setting sequence SC defining an order of setting the setting items SI1 to SI13. The memory 26 stores the setting sequence SC and the setting items SD to SI13. The setting sequence SC allows the user to easily set the setting items SI1 to SI13.

Examples of the setting items SD to SI13 can include control parameters of the motor 2, control modes of the motor 2, and parameter setting modes. Examples of the control parameters include a type of a motor, a type of load for the motor, information regarding existence or non-existence of an encoder, a type of a control mode to control the motor, information regarding to a protection function to protect the motor, and a rotational direction of a rotor of the motor. Examples of the control parameters can further include a rated power of the motor, a rated voltage of the motor, a rated current of the motor, a rated base frequency of the motor, a total number of poles of the motor, a rated rotational speed of the motor, and an input pulse of the encoder.

Examples of the control modes can include an open loop vector (OLV) control mode, a closed loop vector (CLU) control mode, a V/f control mode, and a simple drive mode. Examples of the parameter setting mode includes a test run mode and an auto-tuning mode. In the test run mode, a test run of the motor is executed based on current settings of the motor control apparatus 10. In the auto-tuning mode, at least one of the control parameters is automatically tuned by the motor control apparatus 10.

As seen in FIG. 2, the motor control apparatus 10 includes a setting selector 47 connected to the memory 26. The setting selector 47 is configured to select a newly selected item from among the setting items SI based on the setting sequence SC, the user input UI0, and a currently selected item of the setting items SI. For example, the setting selector 47 allows the user to change the currently selected item from one of the setting items to another of the setting items using the input device 33. In this embodiment, a function of the setting selector 47 is performed by the processor 24 based on the program stored in the memory 26. However, the function of the setting selector 47 can be performed using a circuit other than the processor 24.

The display controller 30 is connected to the setting selector 47. The display controller 30 is configured to control the display 32 to display the currently selected item. The display controller 30 is configured to control the display 32 to display, as the currently selected item, the newly selected item selected by the setting selector 47. The display 32 is connected to the display controller 30 and displays the currently selected item. The input device 33 is connected to the setting selector 47. The setting selector 47 allows the user to change the currently selected item displayed on the display 32 from one setting item to another setting item using the input device 33.

In this embodiment, the setting selector 47 includes a comparator 48 configured to compare the user input UI0 and the currently selected item with the setting sequence SC to determine the newly selected item. The comparator 48 is electrically connected to the memory 26. In this embodiment, a function of the comparator 48 is performed by the processor 24 based on the program stored in the memory 26. However, the function of the comparator 48 can be performed using a circuit other than the processor 24.

As seen in FIG. 4, the setting sequence SC includes a forward direction D1 in which the setting items SI1 to SI13 are arranged in order. The setting sequence SC includes a backward direction D2 opposite to the forward direction D1. The setting selector 47 is configured to select, as the newly selected item, a subsequent item next to the currently selected item in the forward direction D1 from among the setting items SI1 to SI13 based on the setting sequence SC, the forward input UI1, and the currently selected item.

For example, when the setting item SI11 is the currently selected item, the subsequent item corresponds to the setting item SI13. When the forward input UI1 is received by the first arrow key 37 (FIG. 3) in a state where the setting item SI11 is the currently selected item, the setting selector 47 selects the setting item SI13 as the newly selected item based on the setting sequence SC, the forward input UI1, and the currently selected item SI11.

The setting selector 47 is configured to select, as the newly selected item, a previous item next to the currently selected item in the backward direction D2 from among the setting items based on the setting sequence SC, the backward input UI2, and the currently selected item.

For example, when the setting item SI11 is the currently selected item, the previous item corresponds to the setting item SI10. When the backward input UI2 is received by the second arrow key 38 (FIG. 3) in a state where the setting item SI11 is the currently selected item, the setting selector 47 selects the setting item SI10 as the newly selected item based on the setting sequence SC, the backward input UI2, and the currently selected item SI11.

Figure 6:
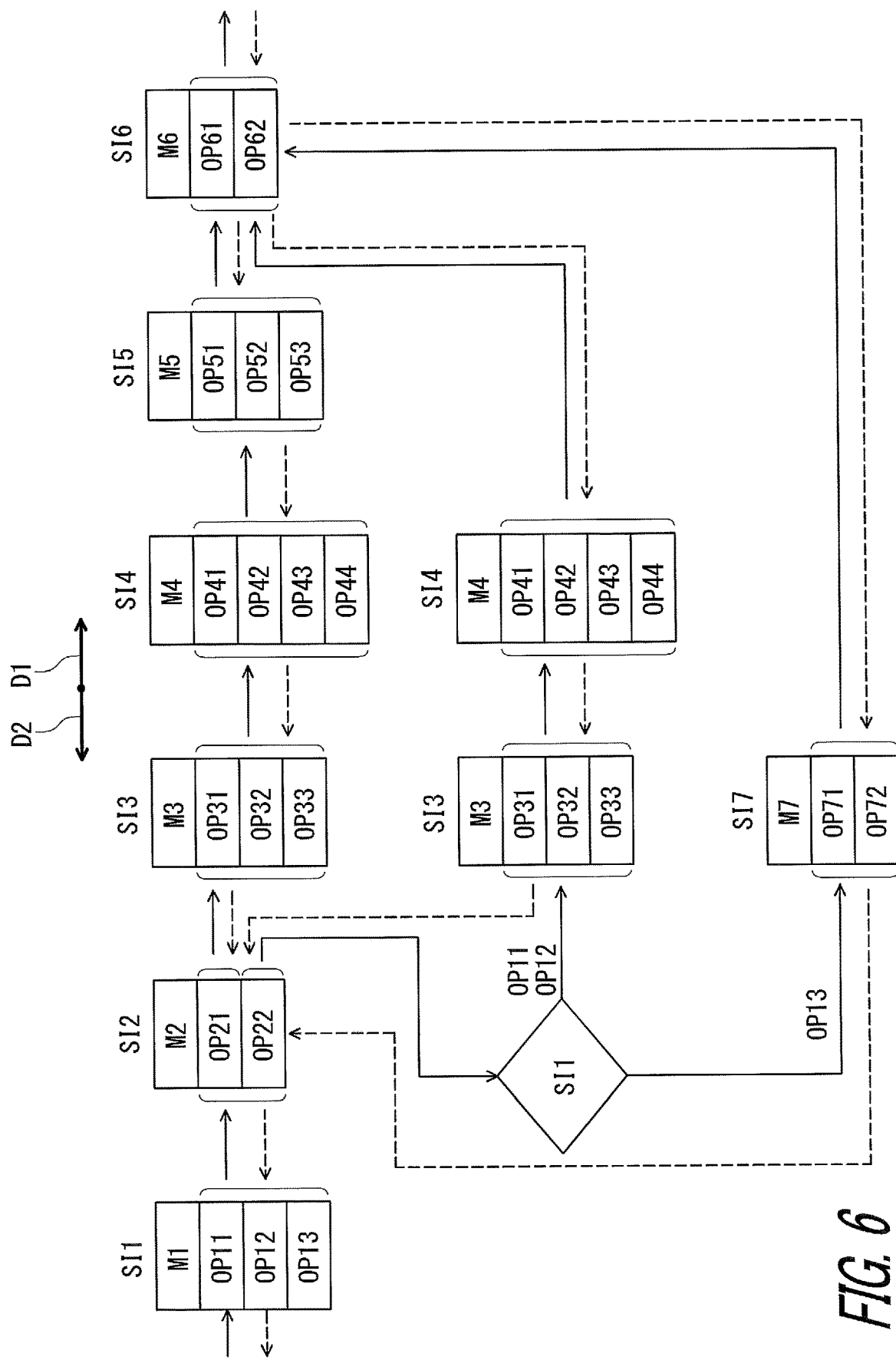
FIG. 6 is a schematic diagram showing the setting sequence of the motor control apparatus illustrated in FIG. 1.
Figure 7:
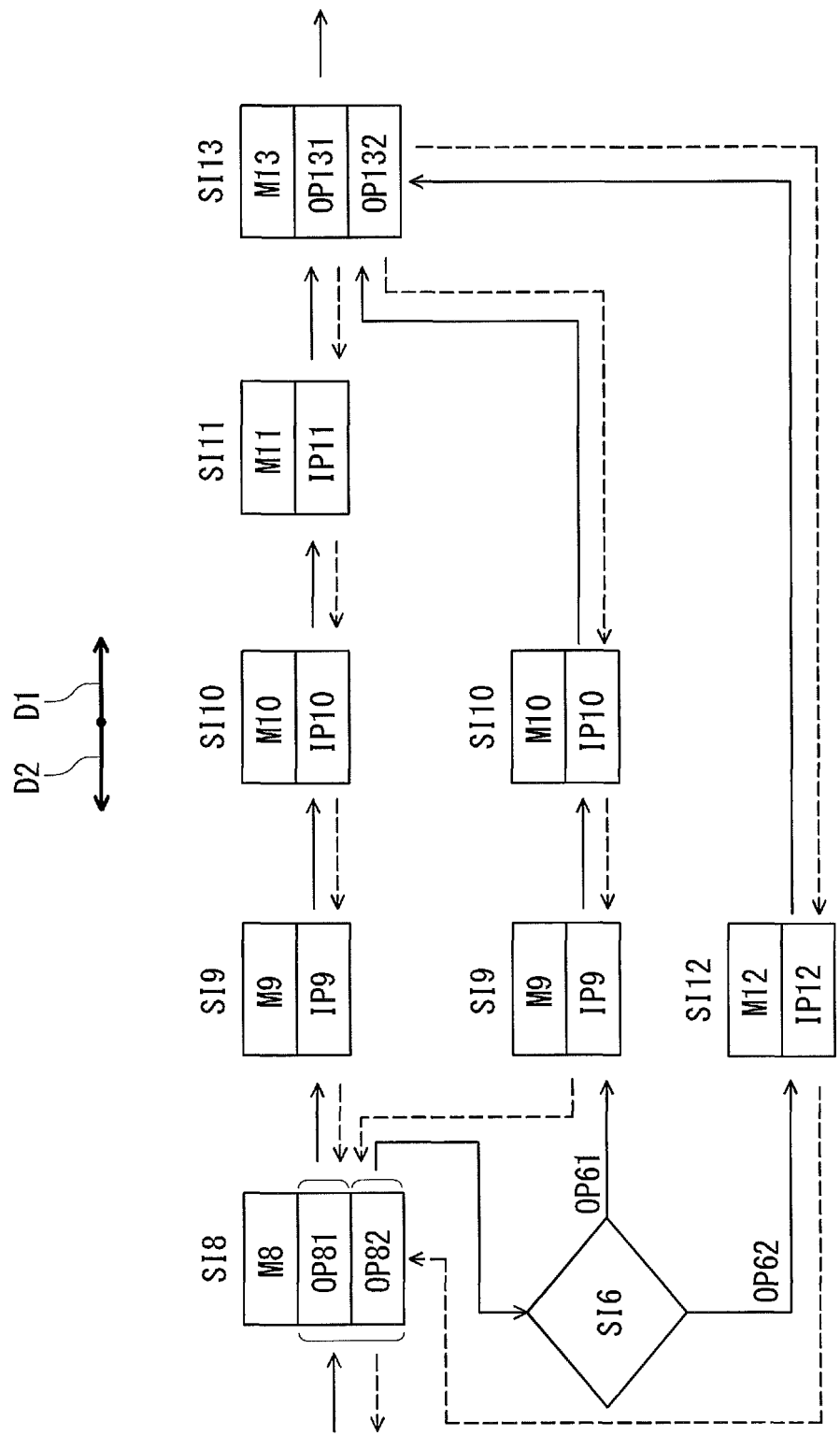
FIG. 7 is a schematic diagram showing the setting sequence of the motor control apparatus illustrated in FIG. 1.

As seen in FIG. 4, the setting items SI includes at least two setting items sequentially adjacent to each other. In the example illustrated in FIG. 4, the setting items SI includes the setting items SI1 to SI13 sequentially adjacent to each other. As seen in FIGS. 5 to 7, the setting sequence SC includes a first correspondence relationship CR1 among the at least two setting items and available user inputs defined as a candidate of the user input UI0. The comparator 48 is configured to compare the currently selected item and the user input UI0 with the first correspondence relationship CR1 to determine the newly selected item. The available user inputs include the forward input UI1, the backward input UI2, the upward input UI3, and the downward input UI4.

For example, as seen in FIG. 5, when the input device 33 receives the forward input UI1 in a state where the currently selected item is the setting item SI1, the comparator 48 compares the setting item SI1 and the forward input UI1 with the first correspondence relationship CR1 to determine the newly selected item SI2.

At least one of the setting items SI includes options each relating to the motor 2. Each of the at least two setting items SI includes options each relating to the motor 2. The memory 26 is configured to store the options of each of the setting items SI. In this embodiment, as seen in FIGS. 6 and 7, each of the setting items SI1 to SI13 includes options each relating to the motor 2. Examples of the options can include the control parameters of the motor 2 and the control modes of the motor 2.

In this embodiment, each of the setting items SI1 to SI8 and SI13 includes options each relating to the motor 2. For example, the setting item SI1 includes options OP11, OP12, and OP13. The setting item SI2 includes options OP21 and OP22. The setting item SI3 includes options OP31, OP32, and OP33. The setting item SI4 includes options OP41, OP42, OP43, and OP44. The setting item SI5 includes options OP51, OP52, and OP53. The setting item SI6 includes options OP61 and OP62. The setting item SI7 includes options OP71 and OP72. The setting item SI8 includes options OP81 and OP82. The setting item SI13 includes options OP131 and OP132. Each of the setting items SI9 to SI12 includes a value of a parameter. In this embodiment, the setting items SI9 to SI12 respectively include input values IP9 to IP12. Any value can be input to the motor control apparatus 10 via the input device 33 as each of the input values IP9 to IP12 within a predetermined range.

The setting selector 47 is configured to select, as a selected option, one of the options of the currently selected item based on the user input UI0 in a case where the currently selected item includes the options. For example, when the setting selector 47 selects the setting item SI1 as the currently selected item, the setting selector 47 selects one of the options OP11, OP12, and OP13 as the selected option based on the upward input UI3 and the downward input UI4. In this embodiment, the selected option is highlighted on the display 32. However, the selected option can be emphasized by surrounding with a frame border or by changing a color.

The setting selector 47 is configured to select, as a selected option, one of the options of the currently selected item based on the user input UI0 in a case where the currently selected item includes the options. The user input UI0 includes a select input. The setting selector 47 is configured to select, as a selected option, one of the options of the currently selected item based on the select input in a case where the currently selected item includes the options. In this embodiment, examples of the select input includes the upward input UI3 and the downward input UI4.

For example, as seen in FIG. 5, the setting selector 47 selects, as the selected option, one of the options OP11 to OP13 of the currently selected item SI1 based on the upward input UI3 and the downward input UI4. When the selected option is the option OP11, the setting selector 47 selects, as the selected option, the option OP12 based on the downward input UI4.

The setting selector 47 is configured to control the memory 26 to store the selected option of the currently selected item based on the forward input UI1. For example, as seen in FIG. 5, when the input device 33 receives the forward input UI1 in a state where the currently selected item is the setting item SI1 and the selected option is the option OP12, the setting selector 47 controls the memory 26 to store the selected option OP12 of the currently selected item SI1 based on the forward input UI1. The forward input UI1 switches the currently selected item from the setting item SI1 to the setting item SI2 and sets the option OP12 as the selected option with switching the currently selected item. In FIGS. 6 and 7, a solid arrow indicates the forward input UI1, and a dotted arrow indicates the backward input UI2.

The memory 26 is configured to store at least one previously selected option. The comparator 48 is configured to compare the currently selected item, the available user inputs, and the at least one previously selected option with the first correspondence relationship CR1 to determine the newly selected item.

For example, as seen in FIG. 5, the memory 26 stores a plurality of previously selected options in different storage areas. The comparator 48 compares the currently selected item, the forward input UI1, and each of the previously selected options OP11 to OP13 with the first correspondence relationship CR1 to determine the newly selected item.

When the input device 33 receives the forward input UI1 in a state where the currently selected item is the setting item SI2 and the previously selected option is the option OP13 of the setting item SI1, the comparator 48 compares the currently selected item SI2, the forward input UI1, and each of the previously selected options OP11 to OP13 with the first correspondence relationship CR1 to determine the newly selected item SI3 or SI7. In this embodiment, the comparator 48 compares the currently selected item SI2, the selected option OP22, the forward input UI1, and the previously selected option OP13 with the first correspondence relationship CR1 to determine the newly selected item SI7.

In other words, the setting selector 47 is configured to select a first newly selected item SI3 as the newly selected item when the at least one previously selected option includes a first selected option OP11 or OP12. The setting selector 47 is configured to select a second newly selected item SI7 as the newly selected item when the at least one previously selected option includes a second selected option OP13 different from the first selected option OP11 or OP12. The first newly selected item SI3 is different from the second newly selected item SI7.

As seen in FIG. 4, the setting sequence SC includes a first route and a second route different from the first route. The first route is defined by at least two of the setting items. The second route is defined by at least two of the setting items. A combination of setting items defining the first route is different from a combination of setting items defining the second route.

In this embodiment, the setting sequence SC includes first to ninth setting routes. One of the first to ninth setting routes corresponds to the first route. Another of the first to ninth setting route corresponds the second route.

The setting items SI1 to SI6, SI8 to SI11, and SI13 are defined on the first setting route. The setting items SI1 to SI4, SI6, SI8 to SI11, and SI13 are defined on the second setting route. The setting items SI1, SI7, SI6, SI8 to SI11, and SI13 are defined on the third setting route. The setting items SI1 to SI6, SI8 to SI10, and SI13 are defined on the fourth setting route. The setting items SI1 to SI6, SI8, SI12, and SI13 are defined on the fifth setting route. The setting items SI1 to SI4, SI6, SI8 to SI10, and SI13 are defined on the sixth setting route. The setting items SI1 to SI4, SI6, SI8, SI12, and SI13 are defined on the seventh setting route. The setting items SI1, SI7, SI6, SI8 to SI10, and SI13 are defined on the eighth setting route. The setting items SI1, SI7, SI6, SI8, SI12, and SI13 are defined on the ninth setting route.

The setting selector 47 is configured to select one of the first route and the second route based on the user input UI0. In this embodiment, the setting selector 47 selects one of the first to ninth setting routes based on the forward input UI1, the enter input, the upward input UI3, and the downward input UI4.

The memory 26 is configured to store available setting sequences SC1 and SC2 as the setting sequence SC. The available setting sequences SC1 and SC2 are at least partly different from each other. The setting selector 47 is configured to select the setting sequence SC from among the available setting sequences SC1 and SC2 based on the user input UI0.

In this embodiment, the memory 26 stores available setting sequences SC1 and SC2 as the setting sequence SC. The available setting sequences SC1 and SC2 are partly different from each other. Unlike the setting sequence SC1, the setting sequence SC2 includes a single route and does not include a plurality of routes.

The setting selector 47 selects one of the setting sequences SC1 and SC2 from among the available setting sequences SC1 and SC2 based on the user input UI0. Specifically, the setting selector 47 selects the setting sequence SC from among the available setting sequences SC1 and SC2 based on the forward input UI1, the upward input UI3, and the downward input UI4.

The memory 26 is configured to store at least one message relating to at least one of the setting items. The setting sequence SC includes a second correspondence relationship CR2 between the at least one message and the at least one of the setting items. In this embodiment, as seen in FIG. 8, the memory 26 stores messages M1 to M13 respectively relating to the setting items SI1 to SI13. The setting sequence SC includes the second correspondence relationship CR2 between the messages M1 to M13 and the setting items SI1 to SI13. Specifically, as seen in FIG. 8, the second correspondence relationship CR2 defines relationship between the messages M1 to M13 and the setting items SI1 to SI13.

In this embodiment, the messages M1 to M13 correspond to the setting items SI1 to SI13. However, at least one of the messages M1 to M13 can be omitted from the second correspondence relationship CR2. Furthermore, a plurality of messages can correspond to one of the setting items SI1 to SI13.

The display controller 30 is configured to control the display 32 to display the at least one message along with the at least one of the setting items based on the second correspondence relationship CR2 and the currently selected item. For example, as seen in FIG. 8, the display controller 30 controls the display 32 to display the message M1 along with the setting item SI1 based on the second correspondence relationship CR2 and the currently selected item SI1.

As seen in FIG. 3, the display 32 includes an item window 49 and a message window 50. The display controller 30 is configured to control the display 32 to display, as the currently selected item, the newly selected item selected by the setting selector 47 in the item window 49. The display controller 30 is configured to control the display 32 to display the at least one message in the message window 50 based on the second correspondence relationship CR2 and the currently selected item displayed in the item window 49. For example, the display controller 30 controls the display 32 to display the message M1 in the message window 50 based on the second correspondence relationship CR2 and the currently selected item SI1 displayed in the item window 49.

The motor control apparatus 10 further includes an auto-tuning device 52 configured to calculate the at least one parameter based on the measured value of the at least one parameter and tuning information stored in the memory 26. In this embodiment, the auto-tuning device 52 calculates the parameters based on the measured value of the parameters and tuning information stored in the memory 26. The tuning information includes a mathematical formula, for example. The auto-tuning device 52 calculates the parameters based on the measured value of the parameters and the mathematical formula. In this embodiment, a function of the auto-tuning device 52 is performed by the processor 24 based on the program stored in the memory 26. However, the function of the auto-tuning device 52 can be performed using a circuit other than the processor 24.

The motor control apparatus 10 includes an encoder 54 configured to sense a rotational position of a rotor of the motor 2. Examples of the encoder 54 can include a magnetic rotary encoder and an optical rotary encoder. The motor control apparatus 10 includes a PG card controller 56 configured to receive signals from the encoder 54 via a PG card 58. The PG card controller 56 is configured to determine a normal state or an abnormal state of the signals form the encoder 54. The PG card controller 56 is electrically connected to the encoder 54 and includes a PG card slot 60. The PG card 58 is provided in the PG card slot 60. The PG card controller 56 is electrically connected to the control signal generator 22, the processor 24, the memory 26, the display controller 30, the display 32, and the input device 33 via the system bus 28.

Figure 9:
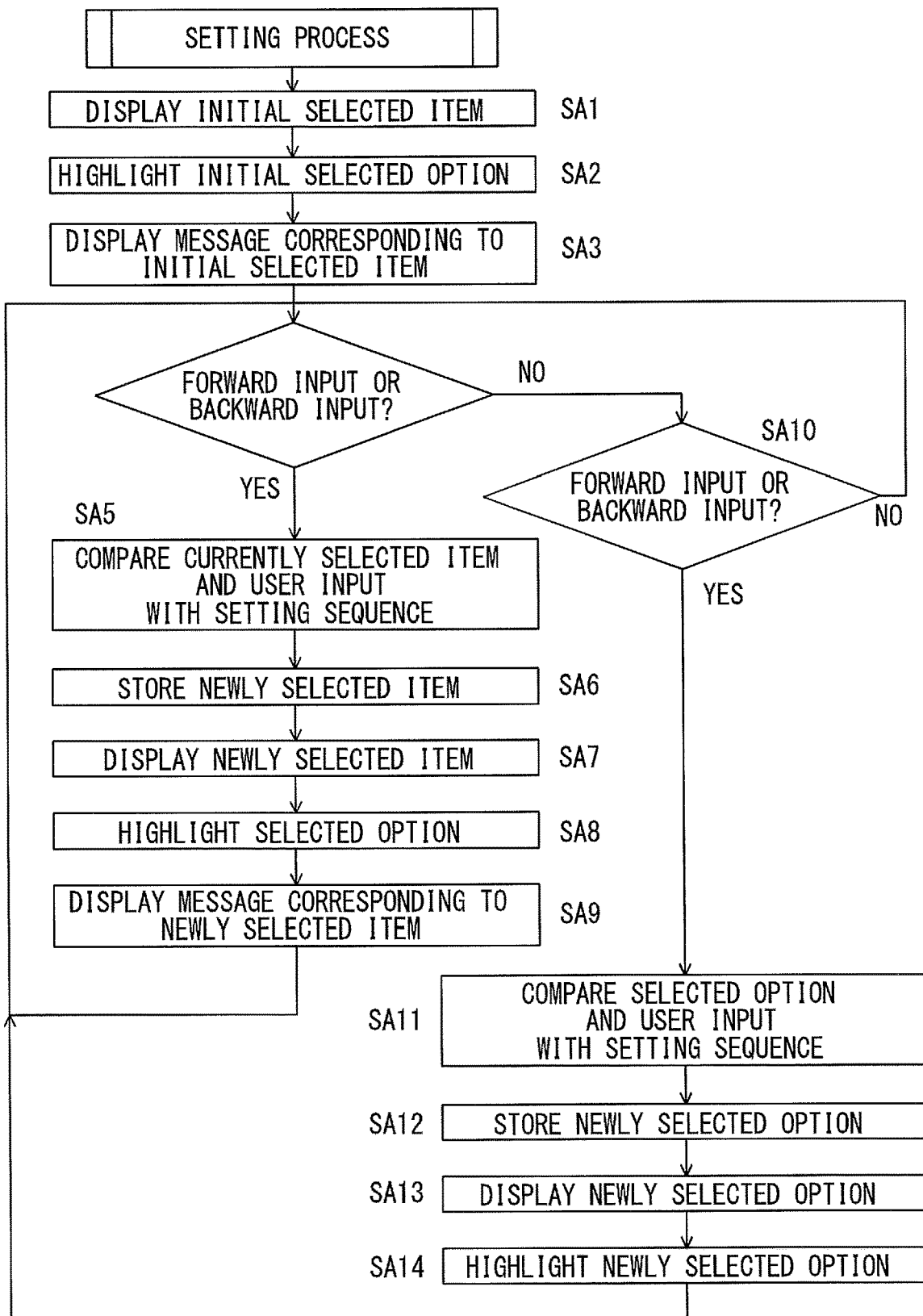
FIG. 9 is a flow chart showing a setting process of the motor control apparatus illustrated in FIG. 1.

As seen in FIG. 9, the method of controlling the motor control apparatus 10 includes storing the setting items and the setting sequence SC to sequentially set the setting items in the memory 26. In this embodiment, the setting items SI1 to SI13 and the setting sequence SC (e.g., SC1 and SC2) to sequentially set the setting items SI1 to SI13 are stored in the memory 26. Specifically, the setting items SI1 to SI13 and the setting sequence SC are stored in the memory 26 before the setting process.

An initial selected item of the setting items SI1 to SI13 is displayed on the display 32 by the display controller 30 (SA1). An initial selected option of options of the initial selected item is highlighted on the display 32 by the display controller 30 (SA2). For example, the initial selected item and the initial selected option are defined in the setting sequence SC. In this embodiment, as seen in FIG. 6, the initial selected item is the setting item SI1, and the initial selected option is the option OP11. A message corresponding to the initial selected item is displayed on the display 32 by the display controller 30 using the second correspondence relationship CR2 (FIG. 8) (SA3). In this embodiment, as seen in FIG. 8, the message M1 corresponding to the initial selected item SI1 is displayed on the display 32 by the display controller 30.

The method includes selecting, by the setting selector 47 connected to the memory 26, the newly selected item from among the setting items based on the setting sequence SC, the user input UI0, and the currently selected item of the setting items. In this embodiment, the newly selected item is selected from among the setting items SI1 to SI13 based on the setting sequence SC, the user input UI0, and the currently selected item of the setting items SI1 to SI13 by the setting selector 47.

The user input UI0 is detected by the setting selector 47. Specifically, the forward input UI1 or the backward input UI2 is detected by the setting selector 47 (SA4). Operation of the first arrow key 37, the second arrow key 38, the first key 40, and the second key 42 is detected by the setting selector 47.

When neither the forward input UI1 nor the backward input UI2 is detected by the setting selector 47, the upward input UI3 and the downward input UI4 are detected by the setting selector 47 (SA10). Operation of the third arrow key 44 and the fourth arrow key 46 is detected by the setting selector 47.

When one of the forward input UI1 and the backward input UI2 is detected by the setting selector 47, the currently selected item and the user input UI0 are compared with the setting sequence SC to determine the newly selected item (SA5). The newly selected item is stored by the setting selector 47 in the memory 26 (SA6). The newly selected item is displayed on the item window by the setting selector 47 (SA7). The selected option is highlighted on the display 32 by the display controller 30 (SA8). The message corresponding to the newly selected item is displayed on the display 32 by the display controller 30 (SA9).

When one of the upward input UI3 and the downward input UI4 is detected by the setting selector 47, the currently selected option and the user input UI0 are compared with the setting sequence SC to determine the newly selected option (SA11). The newly selected option is stored by the setting selector 47 in the memory 26 (SA12). The newly selected option is displayed on the item window by the setting selector 47 (SA13). The selected option is highlighted on the display 32 by the display controller 30 (SA14).

One example of the setting sequence SC of the motor control apparatus 10 will be described in detail below.

FIGS. 10 to 21 illustrate displayed screens of the display 32 of the motor control apparatus 10. FIGS. 22 to 31 illustrate flow charts to set parameters and control modes of the motor control apparatus 10.

Figure 10:
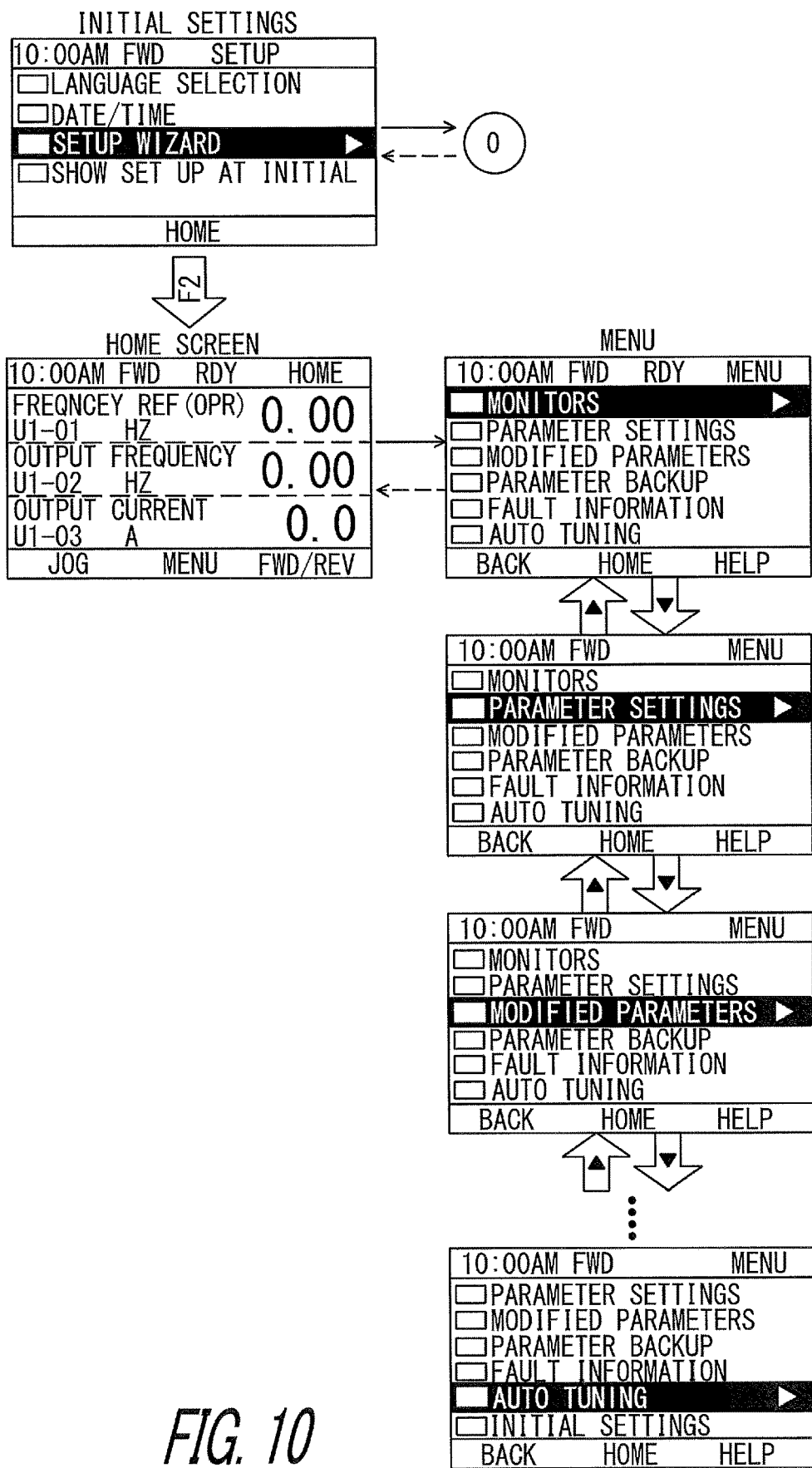
FIGS. 10 to 21 are schematic diagrams showing displayed screens of the setting items of the motor control apparatus illustrated in FIG. 1.

As seen in FIG. 10, an initial settings screen is displayed on the display 32 when the motor control apparatus 10 is turned on. The initial setting screen includes tools "Language selection," "Date/Time," "Setup Wizard," and "Show set up at initial." The tool "Language selection" allows the user to select a working language among available languages using the input device 33. The tool "Date/Time" allows the user to set date and time using the input device 33. The mode "Setup Wizard" allows the user to set setting items necessary to control the motor 2 along the setting sequence SC stored in the memory 26.

Figure 22:
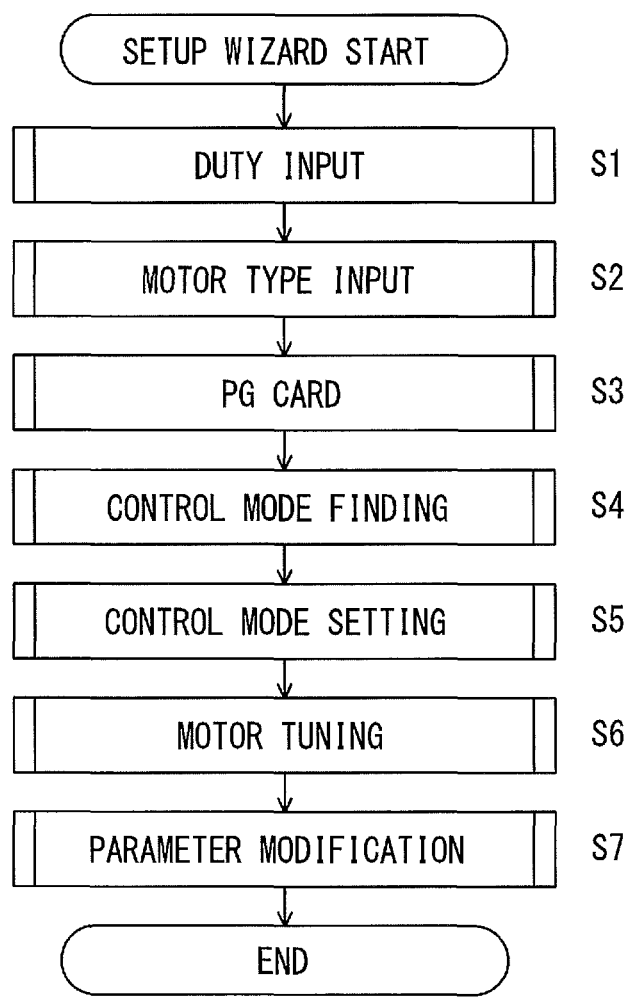
FIGS. 22 to 31 are flow charts showing the setting process along the setting sequence in the motor control apparatus illustrated in FIG. 1.

In the mode "Setup Wizard," settings shown in FIG. 22 are performed along the setting sequence SC. The user can switch a highlighted item from among these items using the third arrow key 44 and the fourth arrow key 46. When the third arrow key 44 is operated by the user, the highlighted item is switched from a currently highlighted item to an upwardly located item. When the fourth arrow key 46 is operated by the user, the highlighted item is switched from a currently highlighted item to a downwardly located item. The process enters the mode "Setup Wizard" when the first arrow key 37 or the first key 40 is operated by the user in a state where the mode "Setup Wizard" is highlighted.

The display controller 30 switches a displayed screen from the initial setting screen to a home screen when the second key 42 is pushed in a state where the initial settings screen is displayed on the display 32. On the home screen, the motor control apparatus 10 stops the motor 2. The display controller 30 switches the displayed screen between the home screen and a menu screen based on the user input UI0. On the menu screen, items "Monitors," "Parameter settings," "Modified parameters," "Parameter backup," "Fault information," and "Auto Tuning" are displayed on the display 32. In a mode "Auto Tuning," control parameters are tuned set by the motor control apparatus 10. In the mode "Auto Tuning," process proceeds based on the setting sequence SC stored in the memory 26.

Setup Wizard

FIGS. 22 to 31 illustrate flow charts of the mode "Setup Wizard" of the motor control apparatus 10 based on the setting sequence SC. As seen in FIG. 22, the setting sequence SC includes a duty-input sub-process, a motor-type-input sub-process, a PG-card sub-process, a control-mode setting sub-process, a motor tuning sub-process, and a parameter-modification sub-process (steps S1 to S7).

In this Setup Wizard, as seen in FIGS. 2 and 22 to 31, the memory 26 stores setting items SI107 to SI116, SI119, SI121 to SI128, SI132, and SI133 as the setting items SI.

The memory 26 stores messages M107 to M116, M119, M121 to M128, M132, and M133. The setting sequence SC includes the first correspondence relationship CR1 (e.g., FIG. 5) among the setting items SI107 to SI116, SI119, SI121 to SI128, SI132, and SI133 and the available user inputs (the forward input UI1, the backward input UI2, the upward input UI3, and the downward input UI4). The setting sequence SC includes the second correspondence relationship CR2 (e.g., FIG. 8) among the setting items SI107 to SI116, SI119, SI121 to SI128, SI132, and SI133, and the messages M107 to M116, M119, M121 to M128, M132, and M133.

Duty-Input Sub-Process

Figure 11:
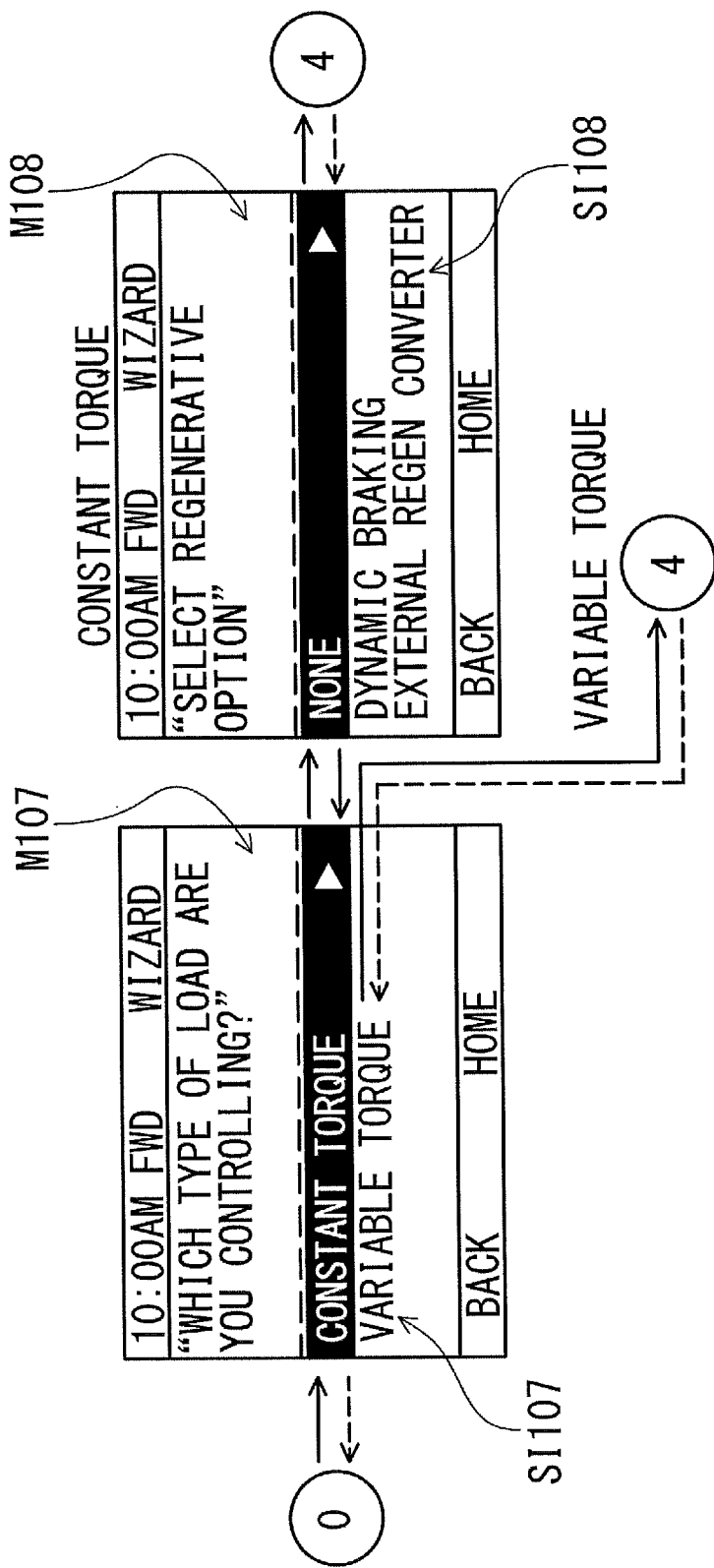
Figure 23:
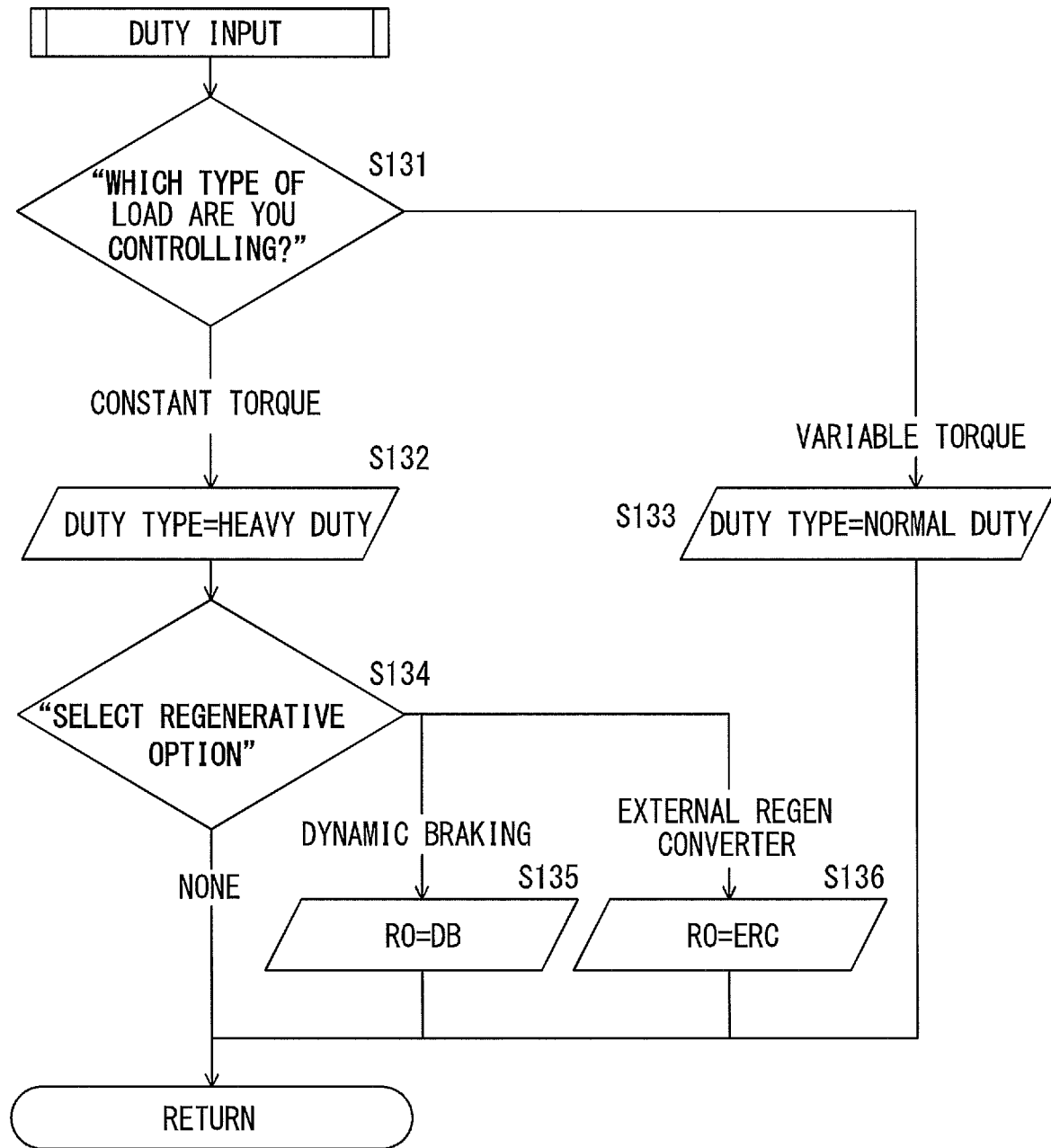

As seen in FIGS. 11 and 23, the Duty-Input Sub-process allows the user to set a type of load. The setting items SI include the type of load. The setting item SI107 and the message M107 are displayed on the item window 49 and the message window 50 by the display controller 30 (S131). The setting item SI107 includes options "Constant Torque" and "Variable Torque." The option "Constant Torque" is highlighted in an initial state as the initial selected option. When the first arrow key 37 or the first key 40 (FIG. 3) is operated by the user, the highlighted option is stored in the memory 26 as the selected option in response to the user input UI0 received by the first arrow key 37 or the first key 40.

When the option "Constant Torque" is selected by the setting selector 47 in response to the user input UI0, the memory 26 stores information indicating heavy duty as a duty type of the motor 2 (S132). When the option "Variable Torque" is selected by the setting selector 47, the memory 26 stores information indicating normal duty as the duty type of the motor 2 (S133), and the process enters the Motor-Type Input Sub-process. The heavy duty (a first duty) is heavier than the normal duty (a second duty) in the motor 2.

After the option "Constant Torque" is selected by the setting selector 47, the setting item SI108 and the message M108 are displayed on the item window 49 and the message window 50 by the display controller 30 in response to the forward input UI1 (S134). Specifically, the setting selector 47 selects the setting item SI108 as the newly selected item from among the setting items SI107 to SI116, SI119, SI121 to SI128, SI132, and SI133 based on the setting sequence SC, the forward input UI1, and the currently selected item SI107. The display controller 30 controls the display 32 to display the newly selected item SI108 selected by the setting selector 47 as the currently selected item. At this time, the comparator 48 compares the forward input UI1 and the currently selected item SI107 with the setting sequence SC to determine the newly selected item SI108. The display controller 30 controls the display 32 to display the message M108 along with the setting items SI108 based on the second correspondence relationship CR2 and the currently selected item SI108. Since the same operation applies to other setting items and other messages based on the forward input UI1, they will not be described in detail here for the sake of brevity.

The setting item SI108 includes options "None," "Dynamic Braking," and "External Regen Converter." The option "None" is highlighted in an initial state as the initial selected option. When the first arrow key 37 or the first key 40 is operated by the user, the setting selector 47 stores the highlighted option in the memory 26 as the selected option in response to the forward input UI1 received by the first arrow key 37 or the first key 40.

When the option "None" is selected by the setting selector 47 in response to the forward input UI1, the process enters the Motor-Type Input Sub-process. When the option "Dynamic Braking" is selected by the setting selector 47 in response to the forward input UI1, the memory 26 stores information indicating the dynamic braking ("DB") as the regenerative option ("RO") (S135), and the process enters the Motor-Type Input Sub-process. When the option "External Regen Converter" is selected by the setting selector 47 in response to the forward input UI1 received by the first arrow key 37 or the first key 40, the memory 26 stores information indicating the external regenerative converter ("ERC") as the regenerative option ("RO") (S136), and the process enters the Motor-Type Input Sub-process.

Motor-Type Input Sub-Process

Figure 12:
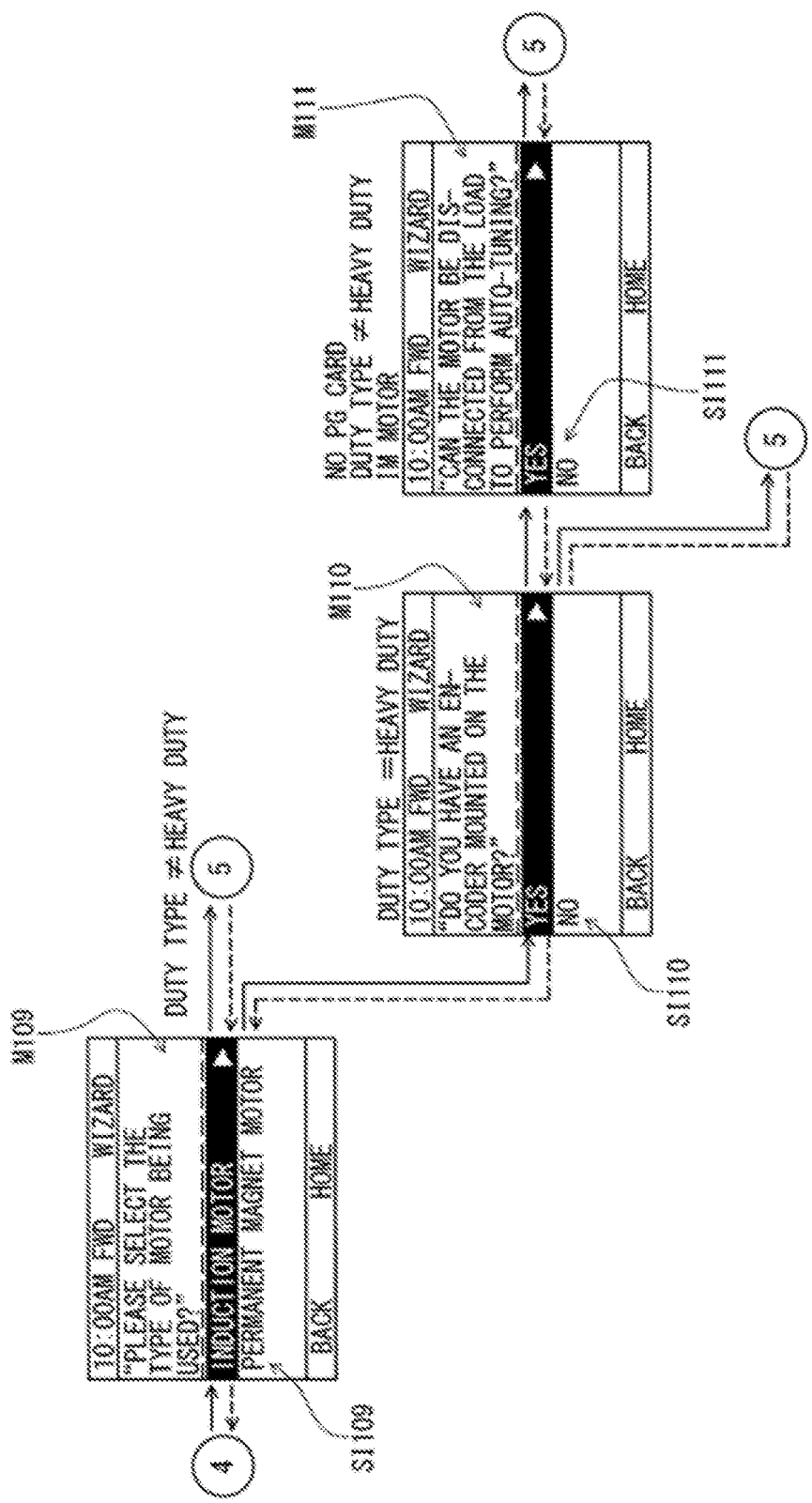
Figure 24:
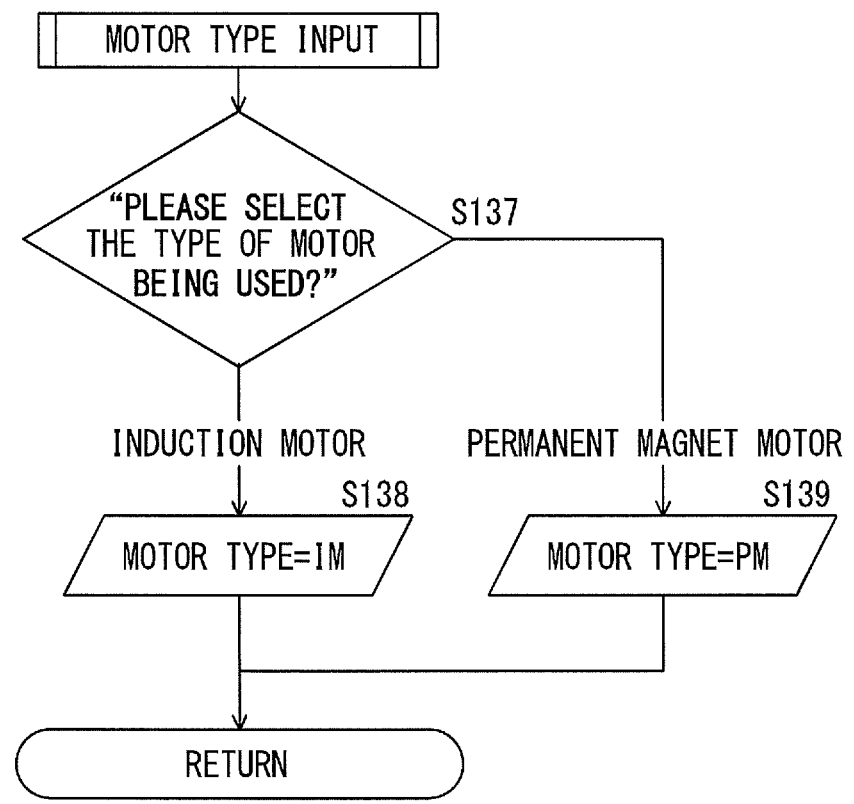

As seen in FIGS. 12 and 24, the Motor-Type Input Sub-process allows the user to set a motor type. The setting item SI109 and the message M109 are displayed on the item window 49 and the message window 50 by the display controller 30 (S137). The setting item SI109 includes options "Induction Motor" and "Permanent Magnet Motor." The option "Induction Motor" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40. The setting item SI109 can include other types of motor.

When the option "Induction Motor" is selected by the setting selector 47 in response to the forward input UI1, the memory 26 stores information indicating the induction motor ("IM" or "IM motor") as the motor type (S138), and the process enters the PG Card Sub-process. When the option "Permanent Magnet Motor" is selected by the setting selector 47 in response to the forward input UI1, the memory 26 stores information indicating the permanent magnet motor ("PM" or "PM motor") as the motor type (S139), and the process enters the PG Card Sub-process.

PG Card Sub-Process

Figure 25:
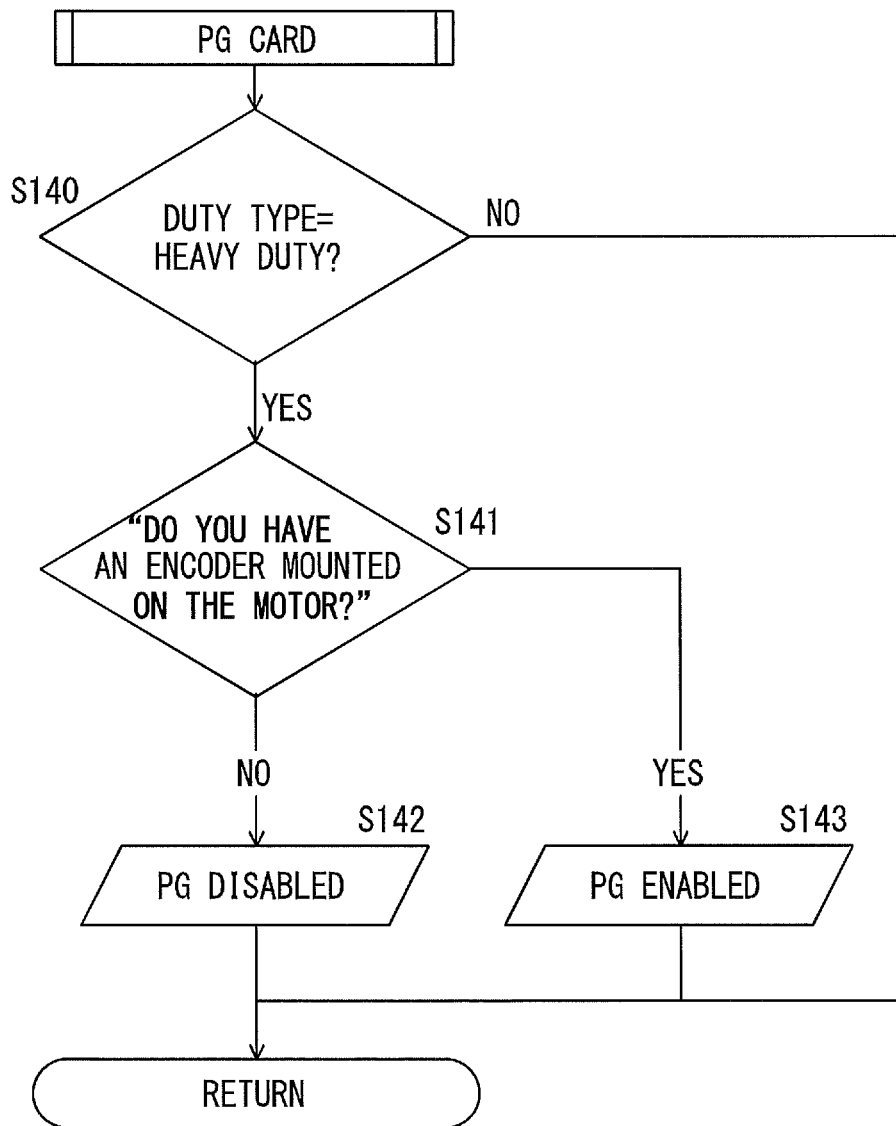

As seen in FIGS. 12 and 25, the PG Card Sub-process allows the user to set existence or non-existence of a PG card to receive signals from the encoder. The setting selector 47 determines that the type of load is the constant torque (heavy duty) or the variable torque (normal duty) (S140). In other words, the setting selector 47 determines whether the duty type of the motor is the heavy duty.

When the duty type is the heavy duty, the setting item SI110 and the message M110 are displayed on the item window 49 and the message window 50 by the display controller 30 (S141). The setting item SI110 includes options "YES" and "NO." The option "YES" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "YES" is selected by the setting selector 47 in response to the forward input UI1 the memory 26 stores information indicating that the PG card is disabled (S142), and the process enters the Control-Mode-Finding Sub-process. When the option "NO" is selected by the setting selector 47 in response to the forward input UI1 the memory 26 stores information indicating that the PG card is enabled (S143), and the process enters the Control-Mode-Input Sub-process.

Control-Mode-Finding Sub-process

Figure 26:
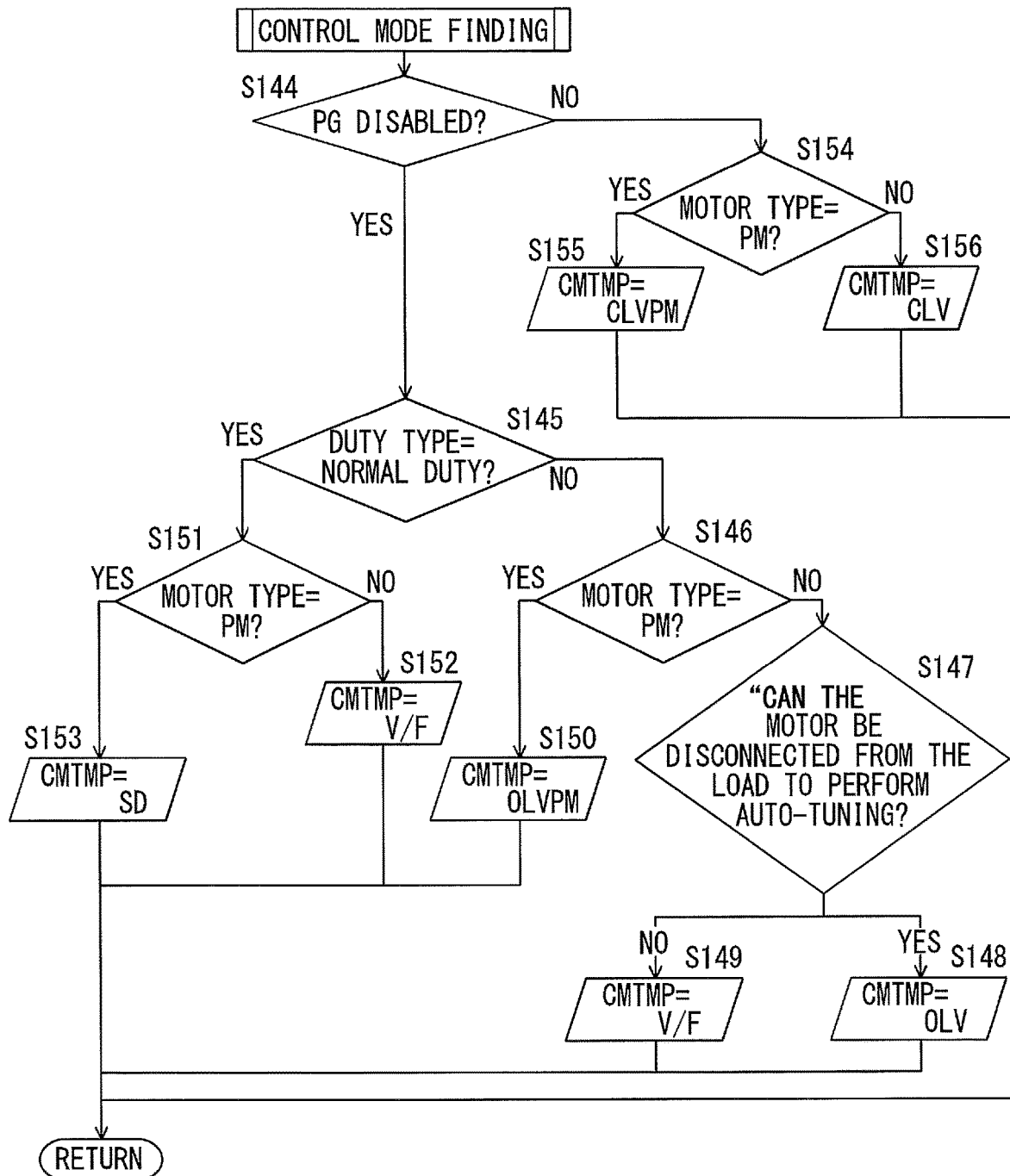

As seen in FIGS. 12 and 26, the Control-Mode-Finding Sub-process allows the user to find a control mode of the motor. The setting selector 47 determines whether the PG card is disabled or enabled (S144). When the PG card is disabled, the setting selector 47 determines whether the duty type is the normal duty (S145). When the duty type is not the normal duty (i.e., the duty type is the heavy duty), the setting selector 47 determines whether the motor type is the permanent magnet motor (S146).

When the motor type is not the permanent magnet motor (i.e., the type of the motor is the induction motor), the setting item SI111 and the message M111 are displayed on the item window 49 and the message window 50 by the display controller 30 (S147). The setting item SI111 includes options "YES" and "NO." The option "YES" is highlighted in an initial state as the initial selected option. When the first arrow key 37 or the first key 40 is operated by the user, the setting selector 47 stores the highlighted option in the memory 26 as the selected option in response to the forward input UI1 received by the first arrow key 37 or the first key 40.

When the option "YES" is selected by the setting selector 47 in response to the forward input UI1 the memory 26 stores information indicating an open-loop vector (OLV) control mode ("OLV") as a temporary control mode ("CMTMP") (S148), and the process enters the Control-Mode-Setting Sub-process. When the option "NO" is selected by the setting selector 47 in response to the forward input UI1 the memory 26 stores information indicating a V/f control mode ("V/F") as the temporary control mode (S149), and the process enters the Control-Mode-Setting Sub-process. The OLV control mode and the V/f control mode have been known in the motor control field. Thus, they will not be described in detail here for the sake of brevity.

When the motor type is the permanent magnet motor in step S146, the memory 26 stores information indicating the OLV control mode for the permanent magnet motor ("OLVPM") as the temporary control mode (S150), and the process enters the Control-Mode-Setting Sub-process.

When the duty type is the normal duty in step S145, the setting selector 47 determines whether the motor type is the permanent magnet motor (S151). When the motor type is not the permanent magnet motor (i.e., the motor type is the induction motor), the memory 26 stores information indicating the V/f control mode as the temporary control mode (S152), and the process enters the Control-Mode-Setting Sub-process. When the motor type is the permanent magnet motor, the memory 26 stores information indicating a simple drive mode ("SD") as the temporary control mode (S153), and the process enters the Control-Mode-Setting Sub-process. The simple drive mode allows the user to control one of several types of motor by partly setting the setting items.

When the PG card is enabled in step S144, the setting selector 47 determines whether the motor type is the permanent magnet motor (S154). When the motor type is the permanent magnet motor, the memory 26 stores information indicating a closed-loop vector (CLV) control mode for the permanent magnet motor ("CLVPM") as the temporary control mode (S155), and the process enters the Control-Mode-Setting Sub-process. When the motor type is not the permanent magnet motor (i.e., the type of the motor is the induction motor), the memory 26 stores information indicating the CLV control mode ("CLV") as the temporary control mode (S156), and the process enters the Control-Mode-Setting Sub-process.

Control-Mode-Setting Sub-Process

Figure 13:
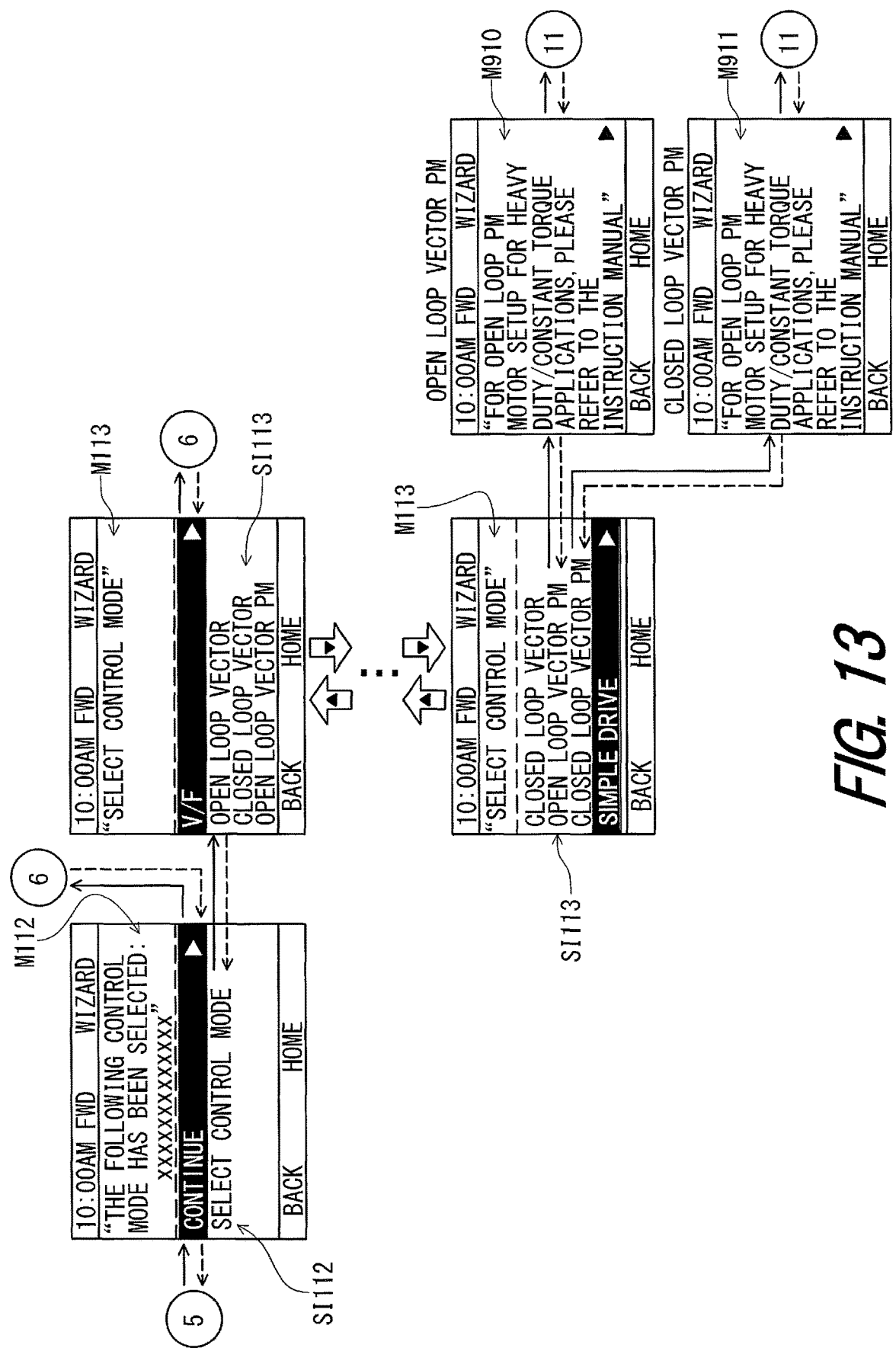
Figure 27:
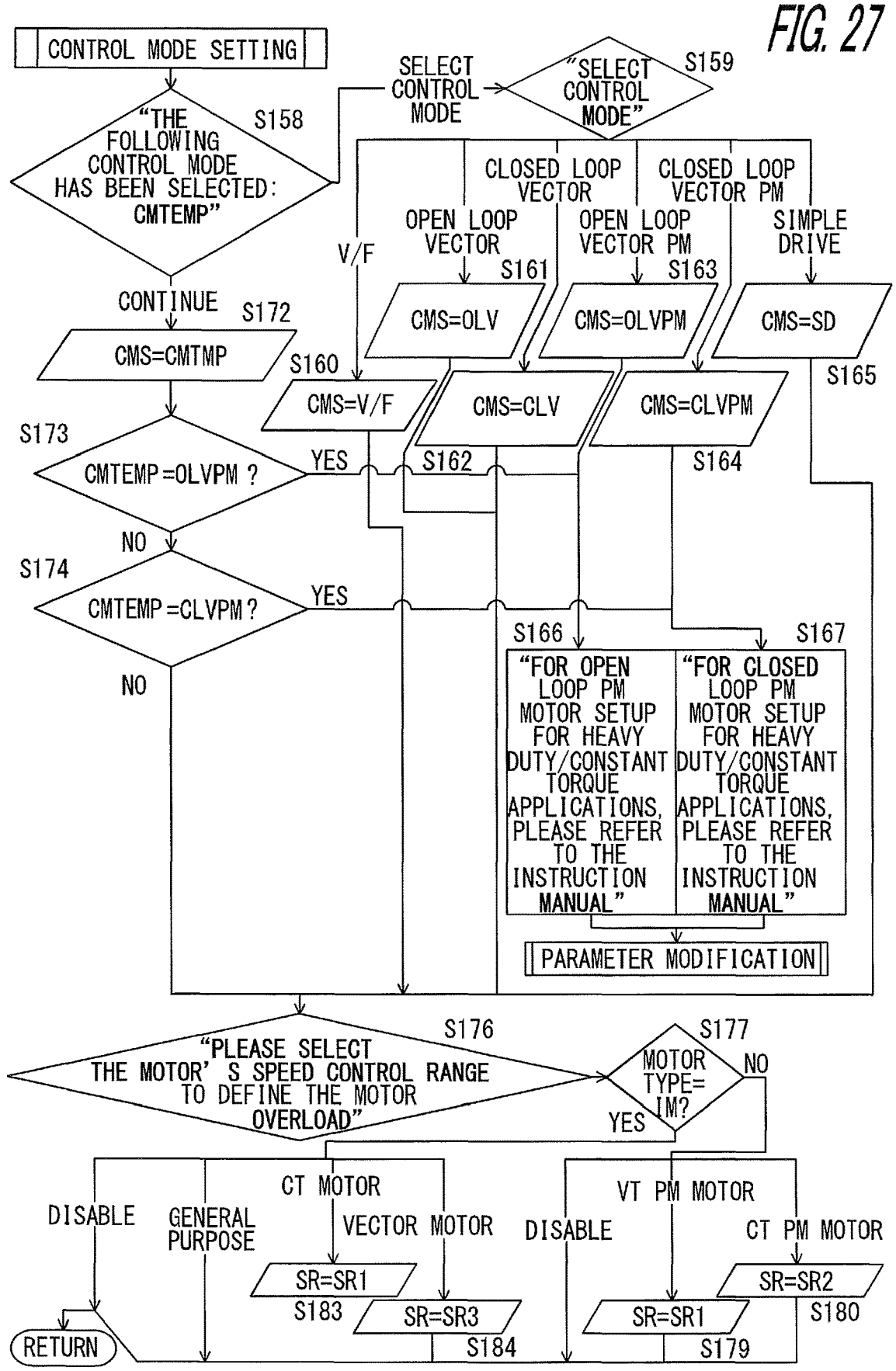

As seen in FIGS. 13 and 27, the Control-Mode-Finding Sub-process allows the user to set a control mode of the motor 2 using the temporary control mode. The setting item SI112 and the message M112 are displayed on the item window 49 and the message window 50 by the display controller 30 (S158). The setting item SI112 includes options "Continue" and "Select Control Mode." The option "Continue" is highlighted in an initial state as the initial selected option. The user can select the type of load from among the options using the input device 33. When the first arrow key 37 or the first key 40 is operated by the user, the highlighted option is stored in the memory 26 as the selected option in response to the forward input UI1 received by the first arrow key 37 or the first key 40.

When the option "Select Control Mode" is selected by the setting selector 47 in response to the forward input UI1, the setting item SI113 and the message M113 are displayed on the item window 49 and the message window 50 by the display controller 30 (S159). The setting item SI113 includes options "V/f," "Open Loop Vector," "Closed Loop Vector," "Open Loop Vector PM," "Closed Loop Vector PM," and "Simple Drive." The option "V/f" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "V/f" is selected by the setting selector 47 in response to the forward input UI1, the memory 26 stores information indicating the V/f control mode as a set control mode ("CMS") (S160). When the option "Open Loop Vector" is selected by the setting selector 47 in response to the forward input UI1, the memory 26 stores information indicating the OLV control mode as the set control mode (S161). When the option "Closed Loop Vector" is selected, the memory 26 stores information indicating the CLV control mode as the set control mode (S162). When the option "Open Loop Vector PM" is selected by the setting selector 47 in response to the forward input UI1, the memory 26 stores information indicating the OLV control mode for the permanent magnet motor as the set control mode (S163). When the option "Closed Loop Vector PM" is selected by the setting selector 47 in response to the forward input UI1, the memory 26 stores information indicating the CLV control mode for the permanent magnet motor as the set control mode (S164). When the option "Simple Drive" is selected by the setting selector 47 in response to the forward input UI1 the memory 26 stores information indicating the simple drive mode as the set control mode (S165). Thus, the user can select the control mode different from the temporary control mode. The motor control apparatus 10 controls the motor 2 in accordance with the set control mode.

When the option "Open Loop Vector PM" is selected in step S159, a message M910 is displayed on the message window 50 (S166), and the process enters the modifying parameter process in response to the first arrow key 37 or the first key 40. When the option "Closed Loop Vector PM" is selected in step S159, a message M911 is displayed on the message window 50 by the display controller 30 (S167), and the process enters the modifying parameter process in response to the first arrow key 37 or the first key 40.

When the option "Continue" is selected by the setting selector 47 in response to the forward input UI1 the memory 26 stores information indicating the temporary control mode as the set control mode (S172). When the set control mode indicates the OLV control mode for the permanent magnet motor, the process enters the step S166 (S173). When the set control mode indicates the CLV control mode for the permanent magnet motor, the process enters the step S167 (S174). When the temporary control mode indicates neither the OLV control mode for the permanent magnet motor nor the CLV control mode for the permanent magnet motor, the process enters the step S176.

Figure 14:
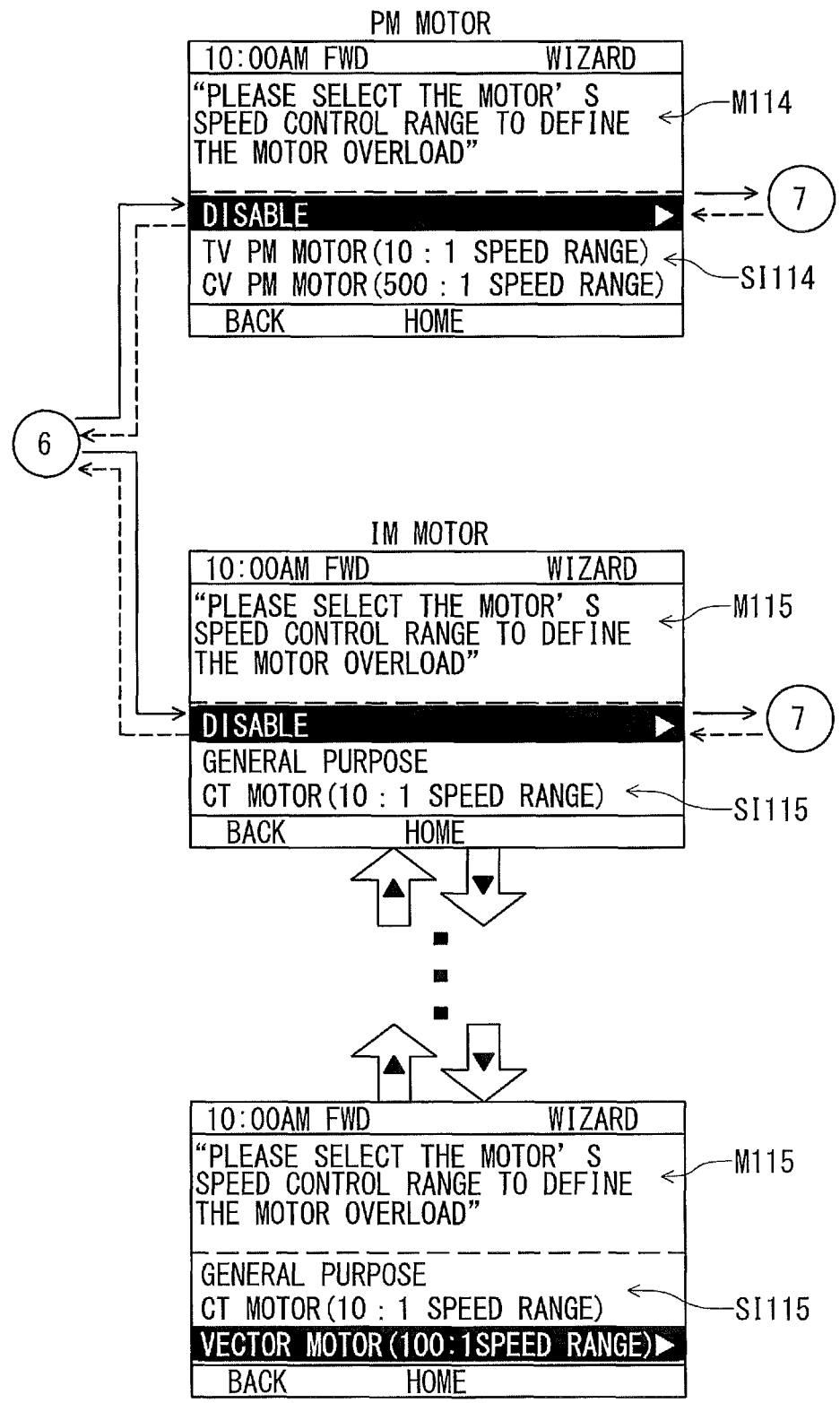

As seen in FIGS. 14 and 27, in step S176, the setting selector 47 determines whether the motor type is the induction motor. When the motor type is not the induction motor (i.e., the motor type is the permanent magnet motor), the setting item SI114 and the message M114 are displayed on the item window 49 and the message window 50 by the display controller 30 (S177). The setting item SI114 includes options "Disable," "VT PM Motor (10:1 Speed Range)," and "CT PM Motor (500:1 Speed Range)." The option "Disable" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "Disable" is selected by the setting selector 47 in response to the forward input UI1, the memory 26 stores information indicating that the speed control range to define the motor overload is not set, and the process enters the Motor Tuning Sub-process. When the option "VT PM Motor (10:1 Speed Range)" is selected by the setting selector 47 in response to the forward input UI1, the memory 26 stores information indicating a first speed control range ("SR1") as the speed control range ("SR") to define the motor overload (S179), and the process enters the Motor Tuning Sub-process. When the option "CT PM Motor (500:1 Speed Range)" is selected by the setting selector 47 in response to the forward input UI1, the memory 26 stores information indicating a second speed control range ("SR2") as the speed control range to define the motor overload (S180), and the process enters the Motor Tuning Sub-process. The second speed control range is different from the first speed control range.

In step S176, when the motor type is the induction motor, the setting item 51115 and the message M115 are displayed on the item window 49 and the message window 50. The setting item 51115 includes options "Disable," "General Purpose," "CT PM Motor (10:1 Speed Range)," and "Vector Motor (100:1 Speed Range)." The option "Disable" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "Disable" is selected by the setting selector 47 in response to the forward input UI1, the memory 26 stores information indicating that the speed control range to define the motor overload is not set, and the process enters the Motor Tuning Sub-process. When the option "General Purpose" is selected by the setting selector 47 in response to the forward input UI1, the memory 26 stores information indicating that the speed control range to define the motor overload is not set, and the process enters the Motor Tuning Sub-process. When the option "VT PM Motor (10:1 Speed Range)" is selected by the setting selector 47 in response to the forward input UI1, the memory 26 stores information indicating the first speed control range ("SR1") as the speed control range to define the motor overload (S183), and the process enters the Motor Tuning Sub-process. When the option "CT PM Motor (500:1 Speed Range)" is selected by the setting selector 47 in response to the forward input UI1 the memory 26 stores information indicating a third speed control range ("SR3") as the speed control range to define the motor overload (S184), and the process enters the Motor Tuning Sub-process. The third speed control range is different from the first speed control range and the second speed control range. Thus, it is possible to set the speed control range to define the motor overload in accordance with the motor type.

Motor Tuning Sub-process

As seen in FIGS. 15, 16, 28 and 29, in the Motor Tuning Sub-process, the auto-tuning of the parameters and the test run of the motor are performed. Before the test run of the motor 2, the setting selector 47 determines the control mode (S185 to S188). When the control mode is the V/f control mode, the OLV control mode, or the CLU control mode, the test run of the motor 2 is performed (S189 to S191).

Figure 15:
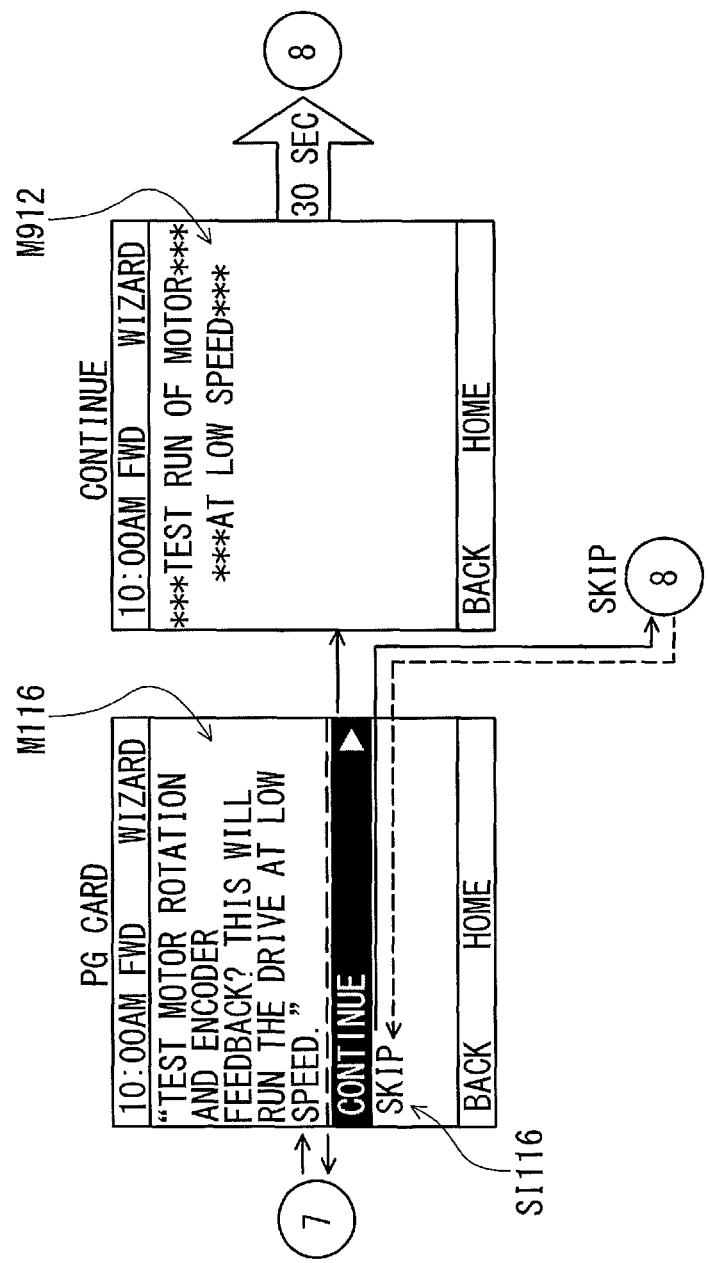
Figure 29:
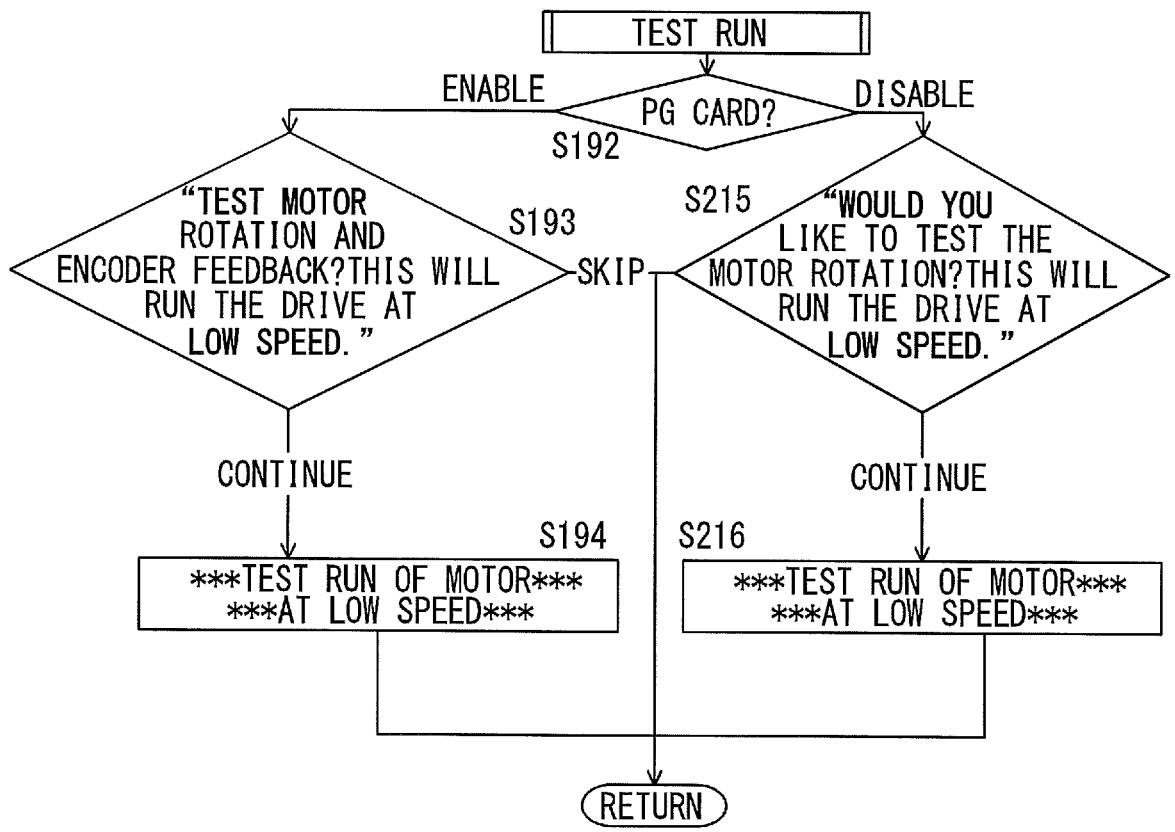

As seen in FIGS. 15 and 29, in the test run, the setting selector 47 determines whether the PG card is enabled (S192). When the PG card is enabled, the setting item SI116 and the message M116 are displayed on the item window 49 and the message window 50. The setting item SI116 includes options "Continue" and "Skip." In other words, one of the setting items includes a test-run execution option and a test-run inexecution option as the options. The test-run execution option indicates execution of the test run of the motor 2. The test-run inexecution option indicates inexecution of the test run of the motor 2. In this embodiment, the option "Continue" corresponds to the test-run execution option, and the option "Skip" corresponds to the test-run inexecution option.

The setting selector 47 is configured to select, as the selected option, one of the test-run execution option and the test-run inexecution option of the currently selected item based on the select input in a case where the currently selected item includes the test-run execution option and the test-run inexecution option.

The option "Continue" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "Continue" is selected by the setting selector 47 in response to the forward input UI1, the test run starts, and a message M912 is displayed on the display 32 (S193 and S194). The test run is performed for 30 seconds, for example. After the test run or when the option "Skip" is selected by the setting selector 47, the process enters the Motor Tuning Sub-process.

The setting selector 47 can be configured to detect error of the PG card to check the PG card after the test run. Furthermore, the setting selector 47 can be configured to switch a rotational direction of a rotor of the motor 2 in accordance with an actual rotational direction of the rotor during the test run.

In other words, the setting items include a setting rotational direction of a rotor of the motor 2. The setting rotational direction includes a first-direction option and a second-direction option. The first-direction option indicates a first rotational direction of the rotor. The second-direction option indicates a second rotational direction of the rotor. The second rotational direction is opposite to the first rotational direction. In this embodiment, the first rotational direction corresponds to one of a forward rotational direction and a reverse rotational direction of the motor 2. For example, the first rotational direction corresponds to the forward rotational direction, and the second rotational direction corresponds to the reverse rotational direction.

The setting selector 47 is configured to select, as a selected-setting-direction option, one of the first-direction option and the second-direction option of the currently selected item based on the select input in a case where the currently selected item includes the first-direction option and the second-direction option. In this embodiment, the setting selector 47 selects, as the selected-setting-direction option, one of the options (e.g., forward rotational direction and reverse rotational direction) based on the upward input UI3 and the downward input UI4.

The setting items include an actual rotational direction of the rotor of the motor 2 during the test run. The actual rotational direction includes a first-actual-direction option and a second-actual-direction option. The first-actual-direction option indicates a first actual rotational direction of the rotor during the test run.

The second-actual-direction option indicates a second actual rotational direction of the rotor during the test run. The second actual rotational direction is opposite to the first actual rotational direction. The setting selector 47 is configured to select, as a selected-actual-direction option, one of the first-actual-direction option and the second-actual-direction option of the currently selected item based on the select input in a case where the currently selected item includes the first-actual-direction option and the second-actual-direction option.

The setting selector 47 is configured to change the selected-setting-direction option from selected one of the first-direction option and the second-direction option to another of the first-direction option and the second-direction option based on the select input in a case where a direction indicated by the selected-actual-direction option is different from a direction indicated by the selected-setting-direction option.

Figure 16:
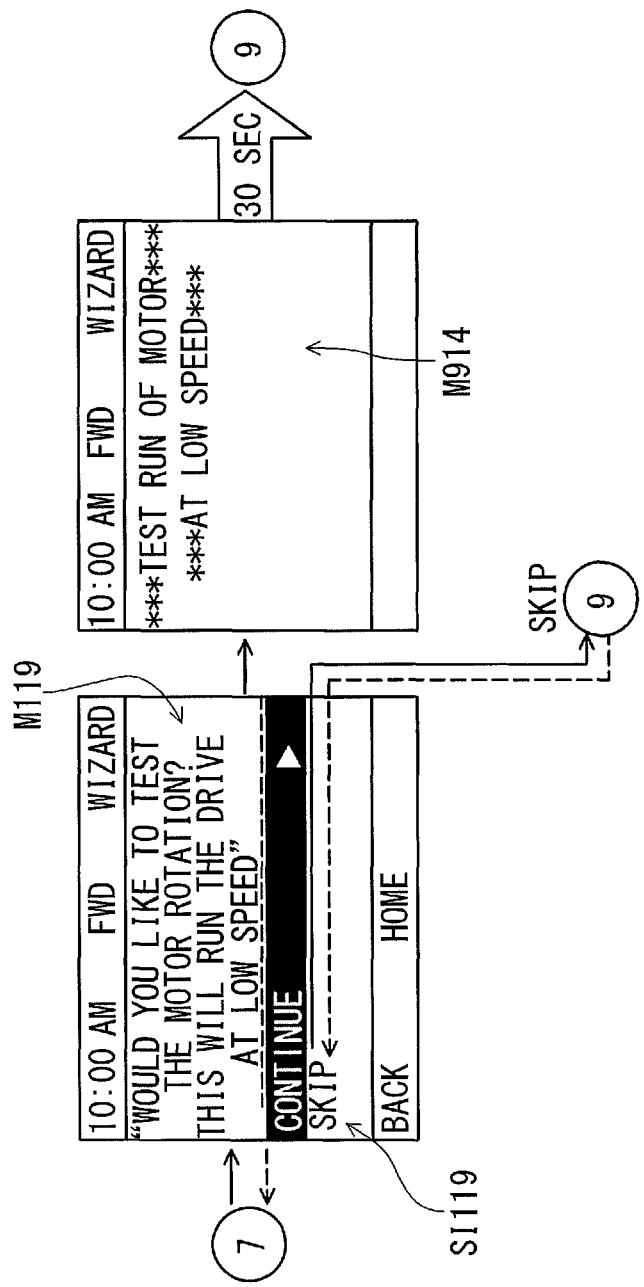

As seen in FIGS. 16 and 29, when the PG card is disabled in step S192, the setting item SI119 and the message M119 are displayed on the item window 49 and the message window 50. The setting item SI119 includes options "Continue" and "Skip." The option "Continue" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "Continue" is selected by the setting selector 47 in response to the forward input UI1, the test run starts, and a message M914 is displayed on the display 32 (S215 and S216). The test run is performed for 30 seconds, for example. After the test run or when the option "Skip" is selected by the setting selector 47, the process enters the Motor Tuning Sub-process.

Figure 28:
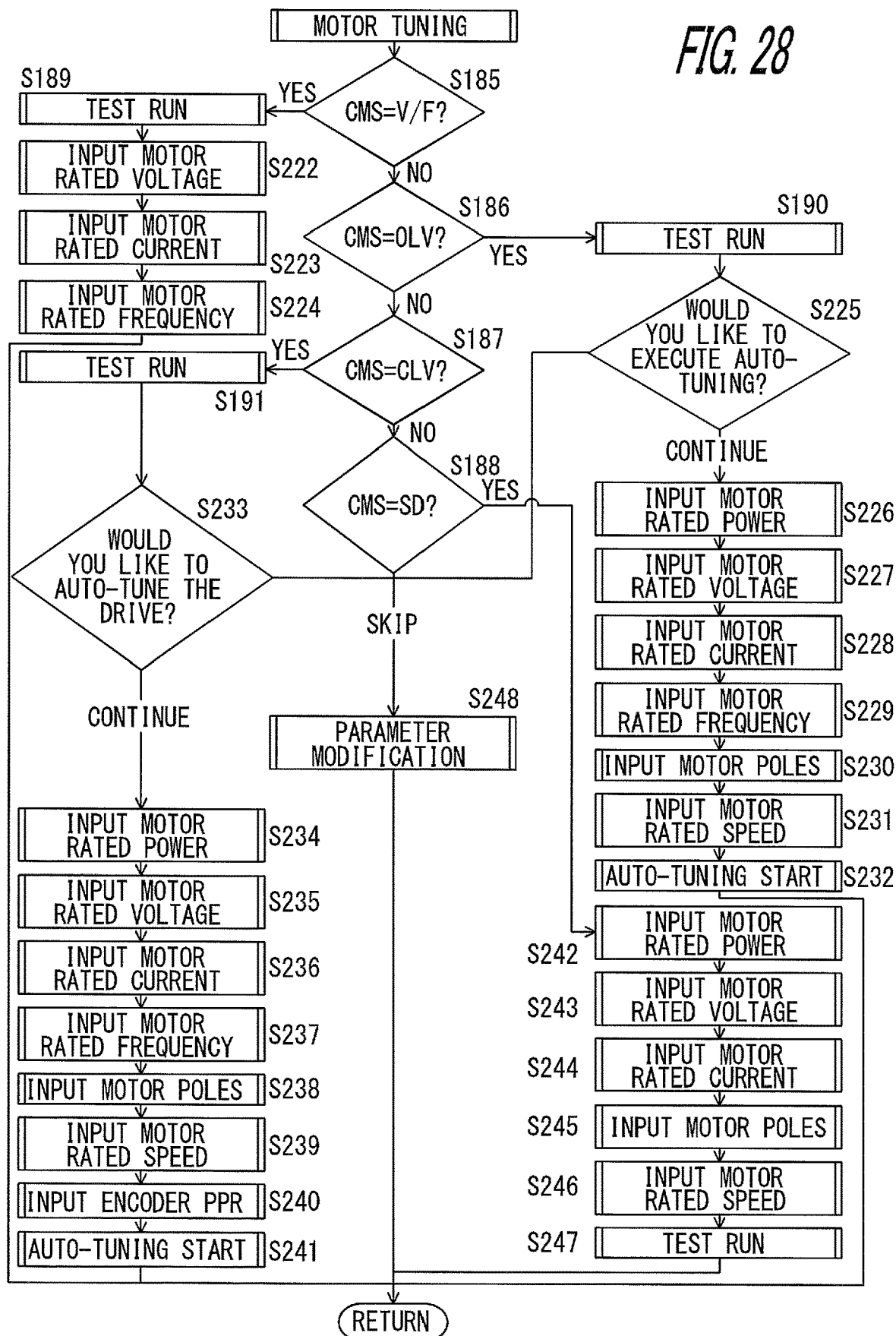

As seen in FIG. 28, after the process returns to the motor tuning mode when the control mode is the V/f mode, input of a rated voltage of the motor, input of a rated current of the motor, and input of a rated frequency of the motor are performed (S222 to S224). The process enters the frequency-input process.

Figure 17:
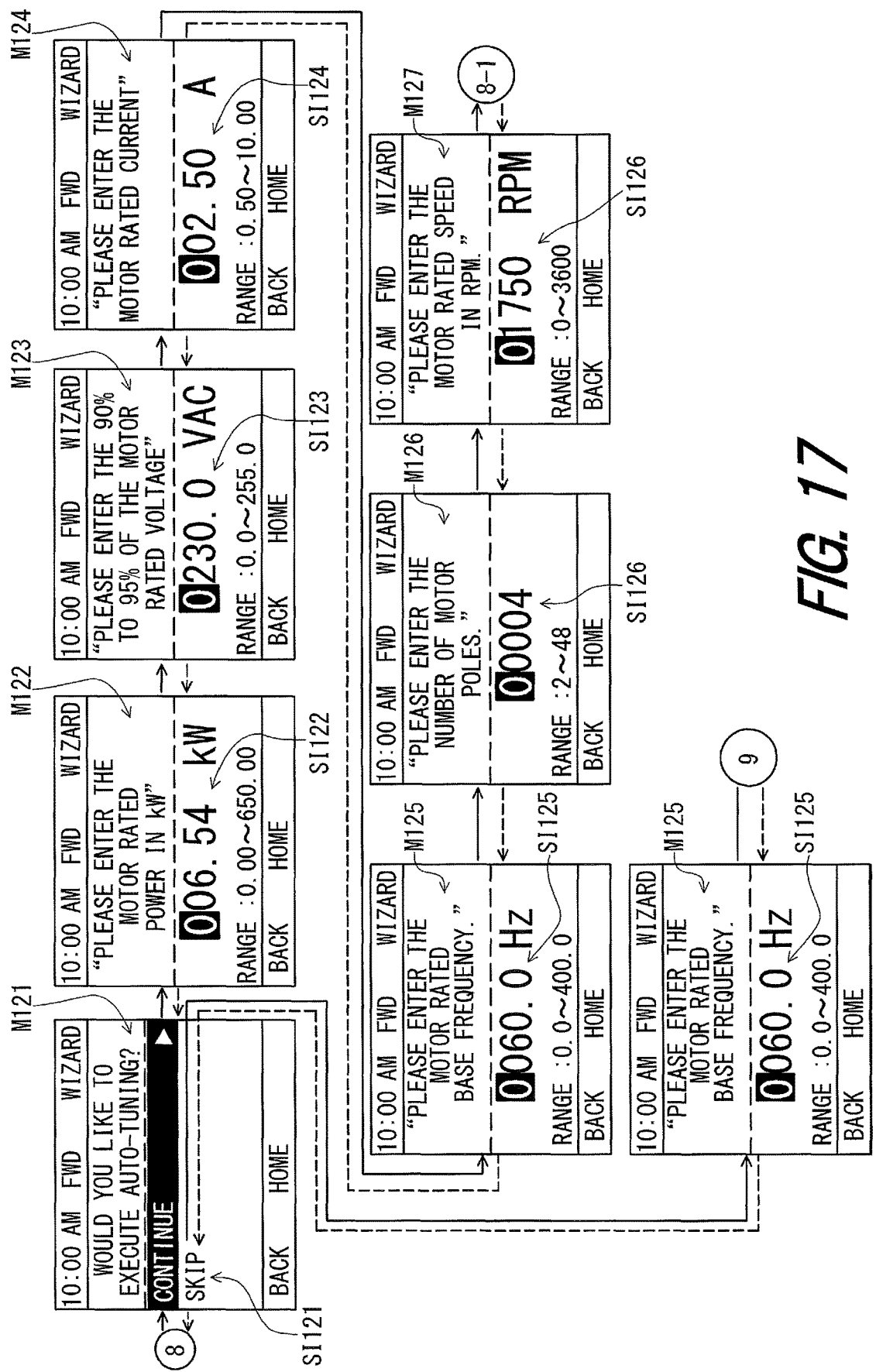

As seen in FIGS. 17 and 28, after the process returns to the motor tuning mode when the control mode is the OLV control mode, the setting item SI121 and the message M121 are displayed on the item window 49 and the message window 50 (S225). The setting item SI121 includes options "Continue" and "Skip." In other words, one of the setting items includes an automatic-tuning execution option and an automatic-tuning inexecution option as the options. The automatic-tuning execution option indicates execution of an auto-tuning in which at least one parameter of the motor 2 is automatically tuned. The automatic-tuning inexecution option indicates inexecution of the auto-tuning. In this embodiment, the option "Continue" corresponds to the automatic-tuning execution option, and the option "Skip" corresponds to the automatic-tuning inexecution option.

The setting selector 47 is configured to select, as the selected option, one of the automatic-tuning execution option and the automatic-tuning inexecution option of the currently selected item based on the select input in a case where the currently selected item includes the automatic-tuning execution option and the automatic-tuning inexecution option. In this embodiment, the setting selector 47 selects, as the selected option, one of the option "Continue" and the option "Skip" based on the upward input UI3 and the downward input UI4.

The option "Continue" is highlighted in an initial state as the initial selected option. When the first arrow key 37 or the first key 40 is operated by the user, the highlighted option is stored in the memory 26 as the selected option in response to the forward input UI1 received by the first arrow key 37 or the first key 40.

When the option "Continue" is selected by the setting selector 47 in response to the forward input UI1 input of a rated power of the motor, input of a rated voltage of the motor, input of a rated current of the motor, input of a rated frequency of the motor, input of a total number of poles of the motor, and input a rated rotational speed of the motor are performed (S226 to S231). In this embodiment, the user input UI0 includes an input of a measured value of the at least one parameter. Thus, the auto tuning starts (S232). In this embodiment, the auto-tuning device calculates the parameters based on the measured value of the parameters and tuning information stored in the memory 26. The auto-tuning has been known in the motor control field, they will not be described in detail here for the sake of brevity. The process enters the frequency-input process.

As seen in FIGS. 17 and 28, after the process returns to the motor tuning mode when the control mode is the CLU control mode, the message M121 and the setting item SI121 are displayed on the item window 49 and the message window 50 by the display controller 30 (S233). When the option "Continue" is selected by the setting selector 47 in response to the forward input UI1 input of a rated power of the motor, input of a rated voltage of the motor, input of a rated current of the motor, input of a rated frequency of the motor, input of a total number of poles of the motor, input a rated rotational speed of the motor, and input of an error code PPR are performed (S234 to S240). Thus, the auto tuning starts (S241). The process enters the frequency-input process.

When the control mode is the simple drive mode, input of a rated power of the motor, input of a rated voltage of the motor, input of a rated current of the motor, input of a rated frequency of the motor, input of a total number of poles of the motor, and input of a rated rotational speed of the motor are performed (S242 to S246). Thus, the test run starts (S247). In the simple drive mode, the auto tuning is omitted. After the test run, the process enters the frequency-input process.

When the option "Skip" is selected in step S225 or S233, the parameter modification is performed (S248).

Figure 30:
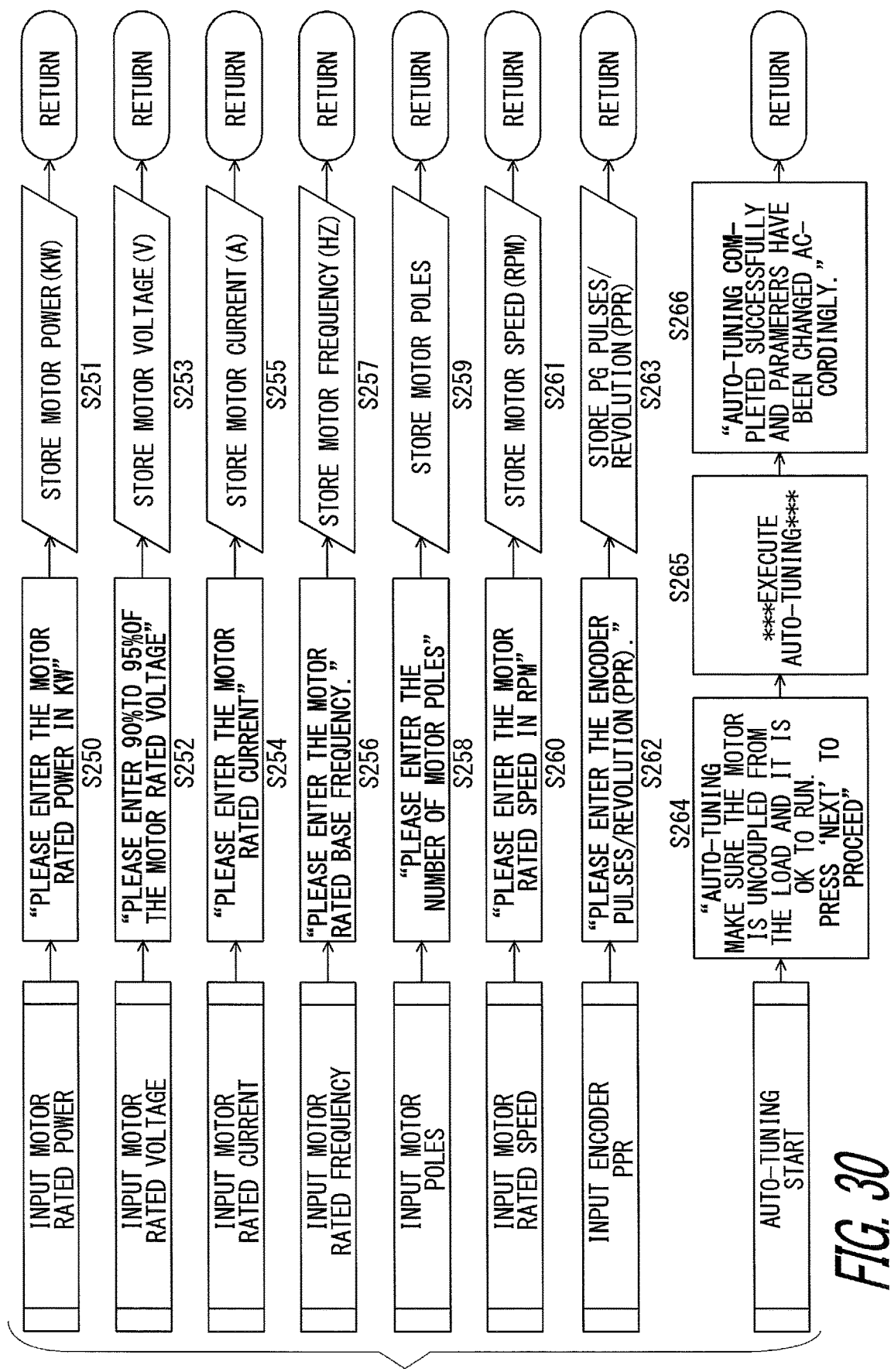

As seen in FIGS. 17 and 30, in the input of the rated power, the setting item SI122 and the message M122 are displayed on the item window 49 and the message window 50 by the display controller 30 (S250). The setting item SI122 includes a numerical input of the rated power. When the first arrow key 37 or the second arrow key 38 is operated, a place of a highlighted digit is changed. When the third arrow key 44 or the fourth arrow key 46 is operated, a numerical number of the highlighted digit is changed. When the first key 40 is operated, a displayed rated power is stored in the memory 26 (S251).

In the input of the rated voltage, the setting item SI123 and the message M123 are displayed on the item window 49 and the message window 50 (S252). The setting item SI123 includes a numerical input of the rated power. When the first arrow key 37 or the second arrow key 38 is operated, a place of a highlighted digit is changed. When the first arrow key 37 or the second arrow key 38 is operated, a numerical number of the highlighted digit is changed. When the first key 40 is operated, a displayed rated voltage is stored in the memory 26 (S253).

In the input of the rated current, the setting item SI124 and the message M124 are displayed on the item window 49 and the message window 50 by the display controller 30 (S254). The setting item SI124 includes a numerical input of the rated power. When the first arrow key 37 or the second arrow key 38 is operated, a place of a highlighted digit is changed. When the third arrow key 44 or the fourth arrow key 46 is operated, a numerical number of the highlighted digit is changed. When the first key 40 is operated, a displayed rated current is stored in the memory 26 (S255).

In the input of the rated frequency, the setting item SI125 and the message M125 are displayed on the item window 49 and the message window 50 by the display controller 30 (S256). The setting item SI125 includes a numerical input of the rated power. When the first arrow key 37 or the second arrow key 38 is operated, a place of a highlighted digit is changed. When the third arrow key 44 or the fourth arrow key 46 is operated, a numerical number of the highlighted digit is changed. When the first key 40 is operated, a displayed rated frequency is stored in the memory 26 (S257).

In the input of the total number of poles, the setting item SI126 and the message M126 are displayed on the item window 49 and the message window 50 (S258). The setting item SI126 includes a numerical input of the rated power. When the first arrow key 37 or the second arrow key 38 is operated, a place of a highlighted digit is changed. When the upward arrow key or the downward arrow key is operated, a numerical number of the highlighted digit is changed. When the first key 40 is operated, a displayed total number of poles is stored in the memory 26 (S259).

In the input of the rated rotational speed, the setting item SI127 and the message M127 are displayed on the item window 49 and the message window 50 by the display controller 30 (S260). The setting item SI127 includes a numerical input of the rated power. When the first arrow key 37 or the second arrow key 38 is operated, a place of a highlighted digit is changed. When the third arrow key 44 or the fourth arrow key 46 is operated, a numerical number of the highlighted digit is changed. When the first key 40 is operated, a displayed rated rotational speed is stored in the memory 26 (S261).

Figure 18:
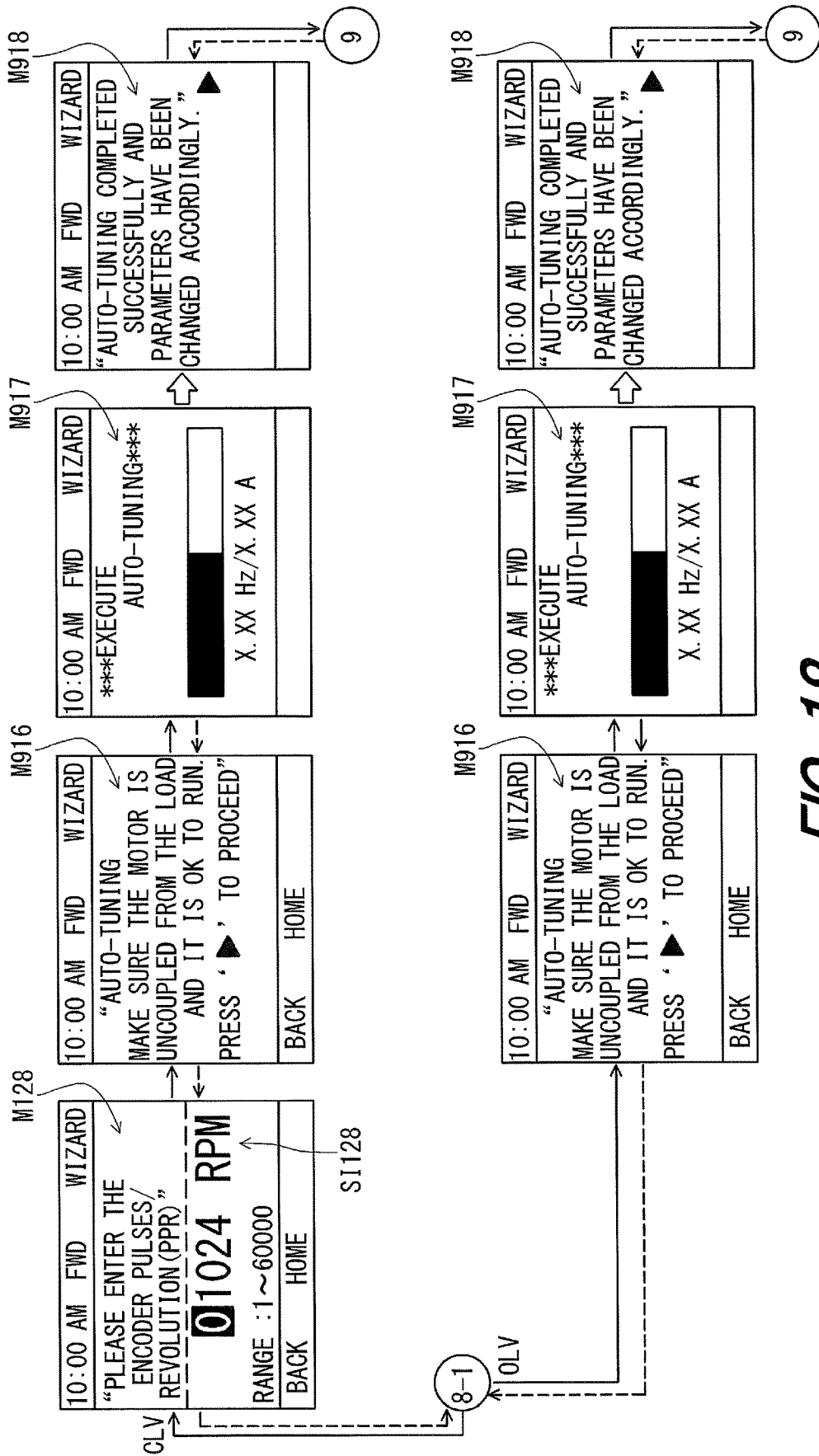

In the CLU control mode, as seen in FIG. 18, in the input of the encoder pulse, the setting item SI128 and the message M128 are displayed on the item window 49 and the message window 50 (S262). The setting item SI128 includes a numerical input of the rated power. When the first arrow key 37 or the second arrow key 38 is operated, a place of a highlighted digit is changed. When the third arrow key 44 or the fourth arrow key 46 is operated, a numerical number of the highlighted digit is changed. When the first key 40 is operated, a displayed encoder pulse is stored in the memory 26 (S263).

In the input of the encoder pulse, a message M916 is displayed on the message window 50 (S264). When the first arrow key 37 or the first key 40 is operated, a message M917 is displayed, and the auto tuning starts (S265). When the auto tuning is completed, a message M918 is displayed (S266).

Figure 19:
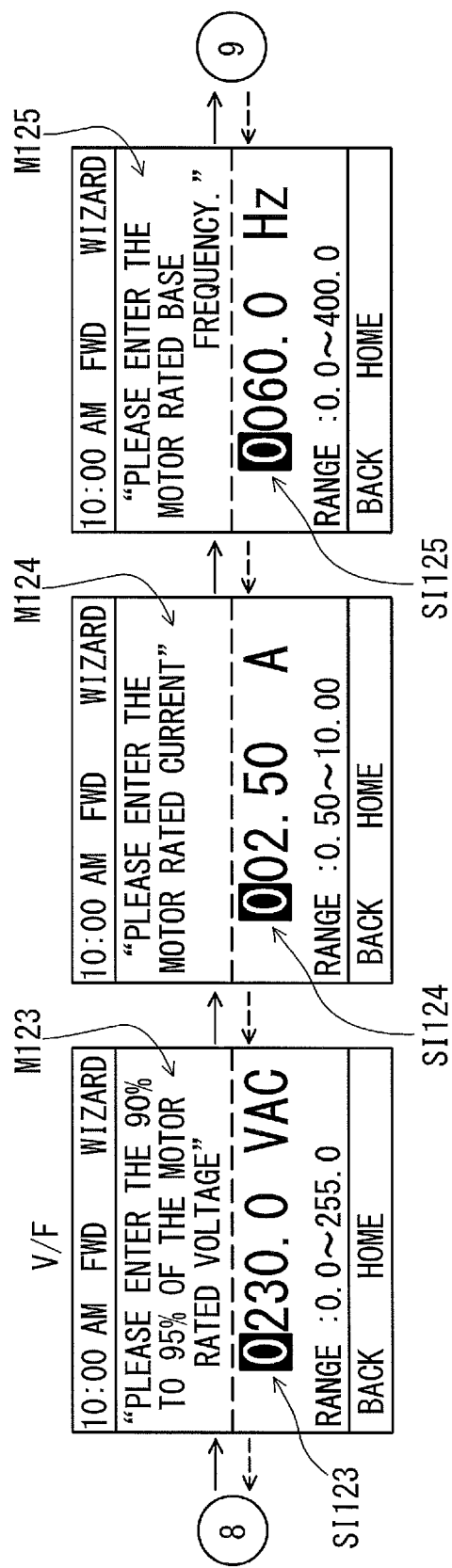
Figure 20:
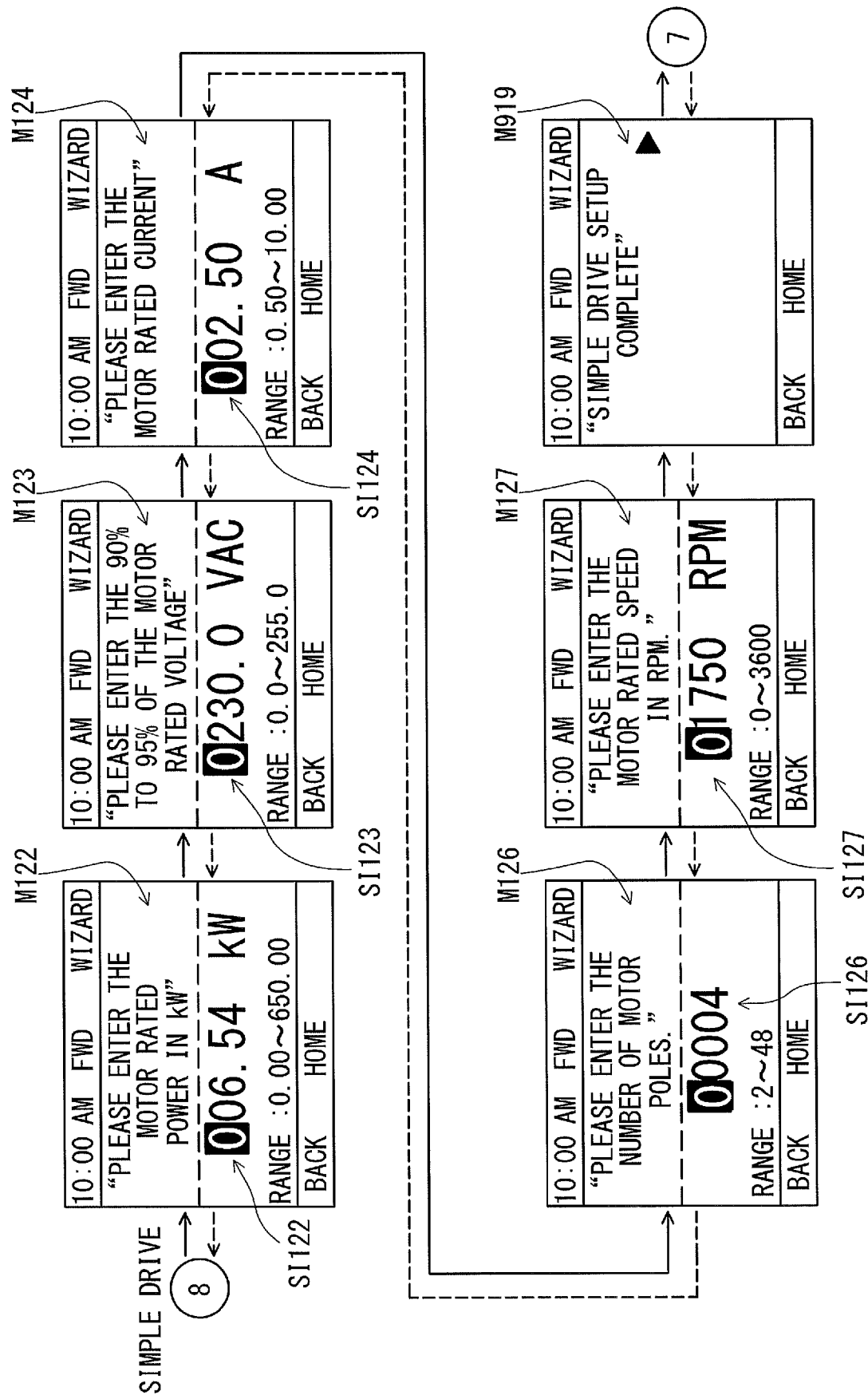

As seen in FIG. 18, in the OLV control mode, the input of the encoder pulse (SI128, M128) is skipped. In the V/f control mode, as seen in FIG. 19, the setting items SI123, SI124, and SI125 are set. As seen in FIG. 20, in the simple drive mode, the setting items SI122 to SI124, SI126, and SI127 are set. A message M919 is displayed before the test run.

As seen in FIG. 10, the motor control apparatus 10 has an auto tuning mode in addition to the Setup Wizard. In this auto tuning mode, the auto-tuning is executed along a setting sequence illustrated in FIGS. 17 and 18. Namely, the motor control apparatus 10 has a first setting sequence performed in the Setup Wizard and a second setting sequence preformed in the auto tuning mode. These two setting sequences can be selected using the input device 33.

In this embodiment, the motor control apparatus 10 has two setting sequences. However, a total number of the setting sequences are not limited to this embodiment. One of these setting sequences can be omitted from the motor control apparatus 10. Another setting sequence can be added to the motor control apparatus 10.

Parameter Modification Sub-Process

Figure 21:
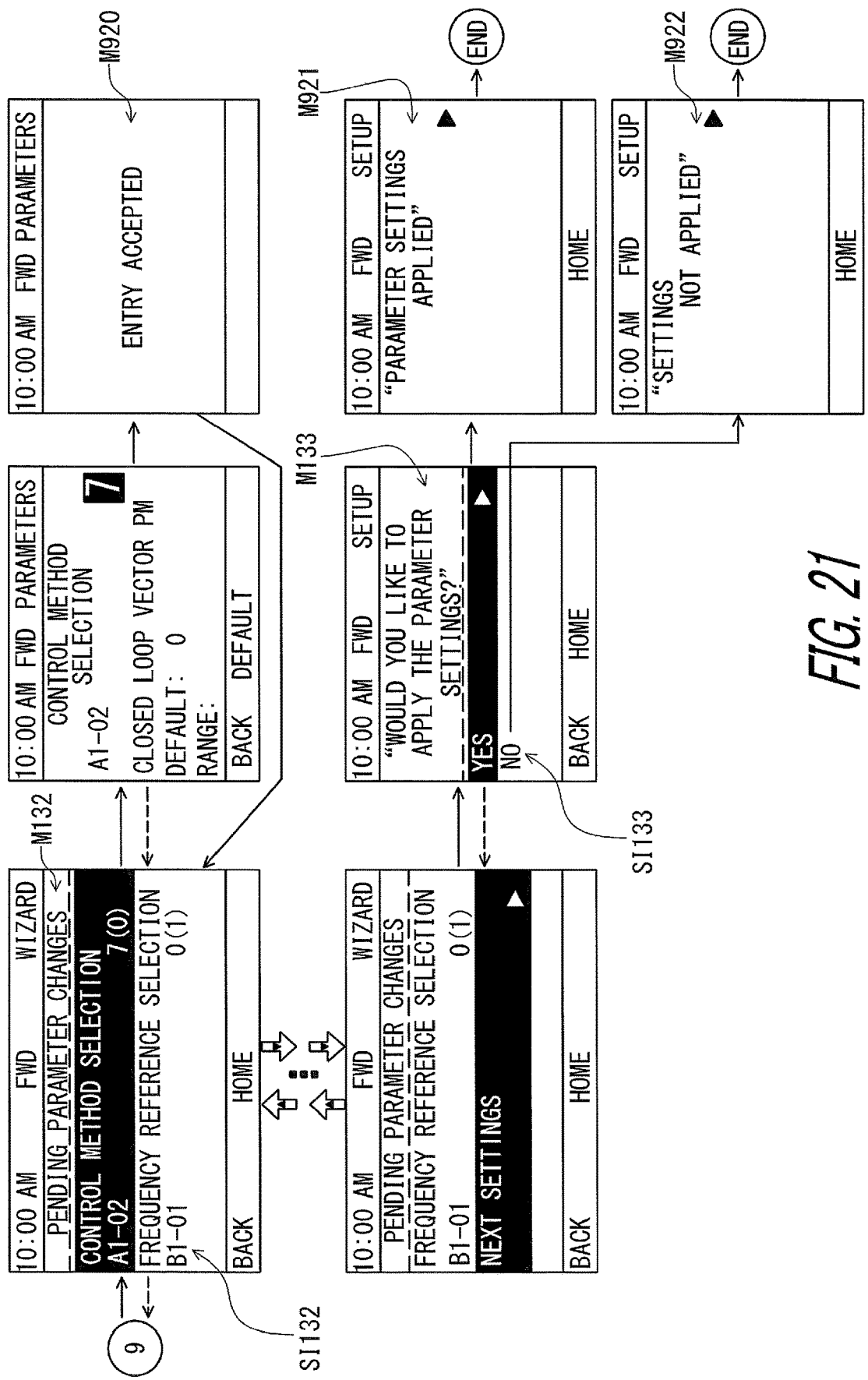
Figure 31:
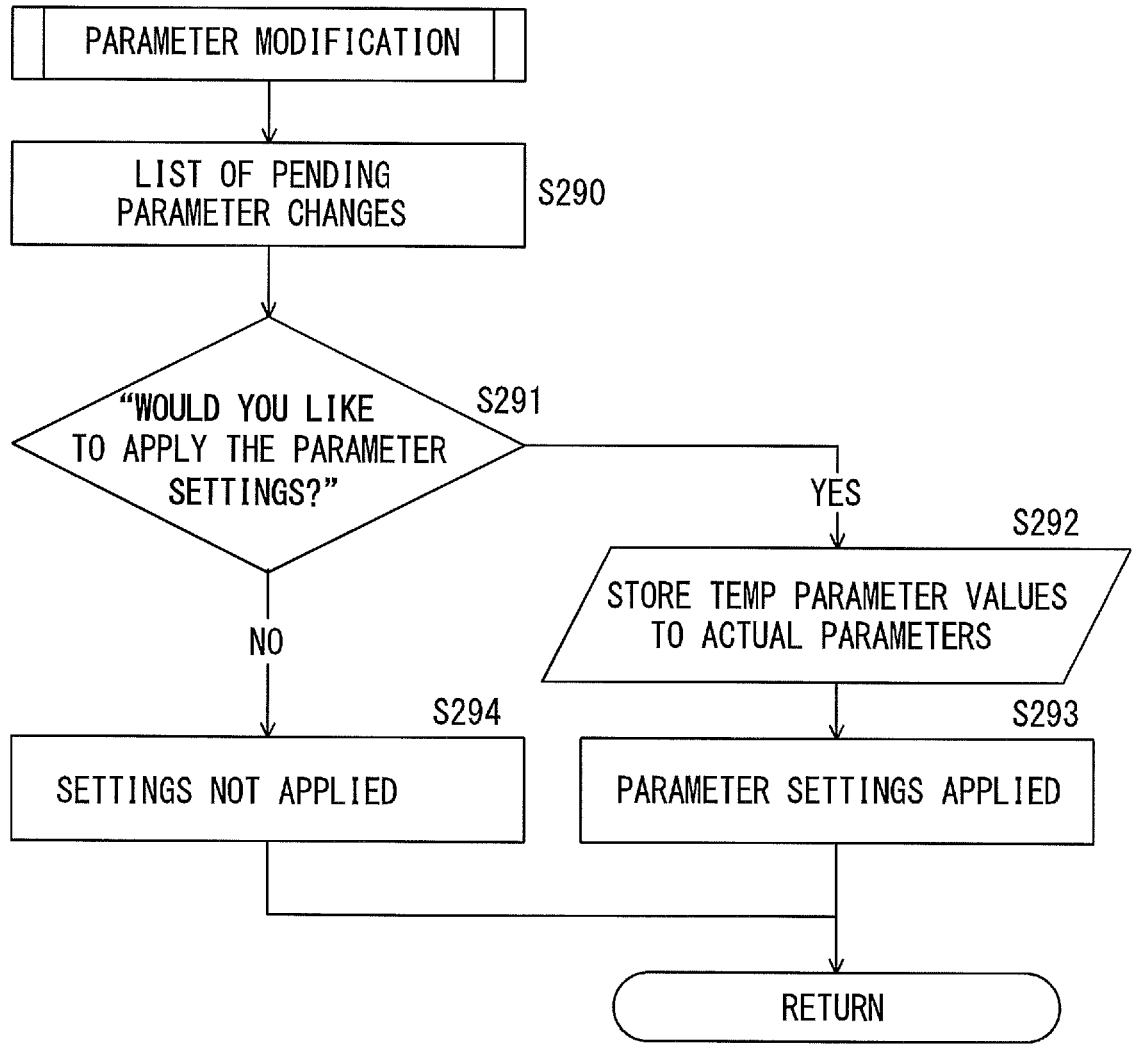

As seen in FIGS. 21 and 31, the Parameter Modification Sub-process allows the user to modify parameters set along the setting sequence SC as necessary. Setting items SI132 and a message M132 are displayed on the item window 49 and the message window 50 by the display controller 30 (S290). The setting items SI132 include setting items changed using the setting sequence SC. When the first arrow key 37 or the first key 40 is operated by the user, the highlighted setting item can be modified using the input device 33. When the first key 40 is operated, a message M920 is displayed, and the screen automatically returns to the setting item SI132 and the message M132 after a predetermined time is elapsed.

When the option "Next Settings" is selected by the setting selector 47 in response to the forward input UI1, the setting item SI133 and the message M133 are displayed on the item window 49 and the message window 50 by the display controller 30 (S291). The setting item SI133 includes options "YES" and "NO."

When the option "YES" is selected by the setting selector 47 in response to the forward input UI1, the parameters set along the setting sequence SC are applied to parameters actually used, and a message M921 is displayed (S292 and S293). When the option "NO" is selected by the setting selector 47 in response to the forward input UI1, the parameters set along the setting sequence SC are not applied to parameters actually used, and a message M922 is displayed (S294).

The motor control apparatus 10 has the following features.

(1) A comparative motor control apparatus includes a plurality of settings to control a plurality of types of motor and/or to adapt the motor to a usage environment. However, in a case where the user is not familiar with controlling of the motor, it is difficult for the user to determine which of the settings is to be set.

With the motor control apparatus 10, however, the setting selector 47 is configured to compare the user input UI0 and the current selected setting of the setting items with the setting sequence SC to determine the next selected setting from among the setting items. Accordingly, it is possible to easily recognize a setting item to be set among the setting items compared with a case where the user needs to find necessary setting items without the setting sequence SC.

(2) The comparator 48 is configured to compare the user input UI0 and the currently selected item with the setting sequence SC to determine the newly selected item. Accordingly, it is possible to sequentially determine the newly selected item based on the setting sequence SC and the user input UI0 even if the user is not familiar with the setting items.

(3) The setting items includes at least two setting items sequentially adjacent to each other. The comparator 48 is configured to compare the currently selected item and the user input UI0 with the first correspondence relationship CR1 to determine the newly selected item. Accordingly, it is possible to make it easier to determine the newly selected item.

(4) The setting selector 47 is configured to select, as the selected option, one of the options of the currently selected item based on the user input UI0 in a case where the currently selected item includes the options. Accordingly, it is possible to easily set a content of the setting item using the options.

(5) The memory 26 is configured to store at least one previously selected option. The comparator 48 is configured to compare the currently selected item, the user input UI0, and the at least one previously selected option with the first correspondence relationship CR1 to determine the newly selected item. Accordingly, it is possible to determine the newly selected item with consideration for the at least one previously selected option, improving flexibility of settings of the motor control apparatus 10.

(6) For example, the setting selector 47 is configured to select the first newly selected item SI3 as the newly selected item when the at least one previously selected option includes the first selected option OP11 or OP12. The setting selector 47 is configured to select the second newly selected item SI7 as the newly selected item when the at least one previously selected option includes the second selected option OP13 different from the first selected item OP11 or OP12. The first newly selected item SI3 is different from the second newly selected item SI7. Thus, different setting items can be newly selected by the setting selector 47 in accordance with previously selected options. Accordingly, it is possible to further adapt the motor control apparatus 10 to the motor 2 and/or a usage environmental.

(7) The newly selected item selected by the setting selector 47 is displayed on the display 32 as the currently selected item. Accordingly, it is easier for the user to recognize the newly selected item.

(8) Since the motor control apparatus 10 includes the display 32, it is easier to display the currently selected item and/or the newly selected item.

(9) The input device 33 makes the user easier to input the user input UI0.

(10) The setting selector 47 is configured to select, as the newly selected item, a subsequent item next to the currently selected item in the forward direction D1 from among the setting items based on the setting sequence SC, the forward input UI1, and the currently selected item. Accordingly, it is possible to switch the setting items in the forward direction D1 along the setting sequence SC in accordance with the user's intention.

(11) The setting selector 47 is configured to select, as the newly selected item, a previous item next to the currently selected item in the backward direction D2 from among the setting items based on the setting sequence SC, the backward input UI2, and the currently selected item. Accordingly, it is possible to switch the setting items in the backward direction D2 along the setting sequence SC in accordance with the user's intention, allowing the user to confirm and/or set a previous set item again.

(12) The first arrow key 37 and the second arrow key 38 of the input device 33 improve operability of the motor control apparatus 10.

(13) The right arrow key and the left arrow key of the input device 33 further improve operability of the motor control apparatus 10.

(14) The first key 40 and the second key 42 of the input device 33 further improve operability of the motor control apparatus 10.

(15) The setting selector 47 is configured to select, as a selected option, one of the options of the currently selected item based on the select input in a case where the currently selected item includes the options. Accordingly, it is possible to set the options of the currently selected item in detail in accordance with the user's intention.

(16) The setting selector 47 is configured to control the memory 26 to store the selected option of the currently selected item based on the forward input UI1. Accordingly, it is possible to store the selected option by the forward input UI1, improving operability of the motor control apparatus 10.

(17) The setting selector 47 is configured to select, as the selected option, one of the test-run execution option and the test-run inexecution option of the currently selected item based on the select input in a case where the currently selected item includes the test-run execution option and the test-run inexecution option. Accordingly, it is possible to select whether the test run of the motor is executed in a series of operation performed along the setting sequence SC.

(18) The setting selector 47 is configured to select, as the selected-setting-direction option, one of the first-direction option and the second-direction option of the currently selected item based on the select input in a case where the currently selected item includes the first-direction option and the second-direction option. Accordingly, it is possible to set the rotational direction of the rotor in a series of operation performed along the setting sequence SC.

(19) The setting selector 47 is configured to select, as the selected-actual-direction option, one of the first-actual-direction option and the second-actual-direction option of the currently selected item based on the select input in a case where the currently selected item includes the first-actual-direction option and the second-actual-direction option.

Accordingly, it is possible to input the actual rotational direction of the rotor in a series of operation performed along the setting sequence SC.

(20) The setting selector 47 is configured to change the selected-setting-direction option from selected one of the first-direction option and the second-direction option to another of the first-direction option and the second-direction option based on the select input in a case where a direction indicated by the selected-actual-direction option is different from a direction indicated by the selected-setting-direction option. Accordingly, it is possible to change the actual rotational direction of the rotor from an unintended rotational direction to an intended rotational direction based on the user input UI0 in a case where the selected one of the first rotational direction and the second rotational direction is different from the intended rotational direction.

(21) The setting selector 47 is configured to select, as the selected option, one of the automatic-tuning execution option and the automatic-tuning inexecution option of the currently selected item based on the select input in a case where the currently selected item includes the automatic-tuning execution option and the automatic-tuning inexecution option. Accordingly, it is possible to set the auto-tuning in a series of operation performed along the setting sequence SC.

(22) The auto-tuning device 52 is configured to calculate the at least one parameter based on the measured value of the at least one parameter and tuning information stored in the memory 26. Accordingly, it is possible to set parameters suitable for an actual usage environment.

(23) The display controller 30 is configured to control the display 32 to display the at least one message along with the at least one of the setting items based on the second correspondence relationship CR2 and the currently selected item. Accordingly, displaying the at least one message makes the user easier to recognize a content of the currently selected item.

(24) The display controller 30 is configured to control the display 32 to display the at least one message in the message window 50 based on the second correspondence relationship CR2 and the currently selected item displayed in the item window 49. Accordingly, the message window 50 and the item window 49 make the user easier to see the at least one message and the currently selected item.

(25) The available setting sequences SC are at least partly different from each other. The setting selector 47 is configured to select the setting sequence SC from among the available setting sequences SC based on the user input UI0. Accordingly, it is possible to improve room for choice of the setting sequence SC, allowing the motor control apparatus 10 to be adapted for usage environment.

(26) The setting sequence SC includes a first route and a second route different from the first route. The first route is defined by at least two of the setting items. The second route is defined by at least two of the setting items. A combination of setting items defining the first route is at least partly different from a combination of setting items defining the second route. Accordingly, it is possible to induce the user to different setting items by setting the first route and the second route.

(27) The setting selector 47 is configured to select one of the first route and the second route based on the user input UI0. Accordingly, it is possible to select the setting sequence SC of the setting items in accordance with the motor and/or the usage environment.

Second Embodiment

A motor control apparatus 210 in accordance with a second embodiment will be described below referring to FIG. 32. The motor control apparatus 210 has the same structures and/or configurations as those of the motor control apparatus 10 except for the arrangement of the display and the input device. Thus, elements having substantially the same function as those in the first embodiment will be numbered the same here, and will not be described and/or illustrated again in detail here for the sake of brevity.

Figure 32:
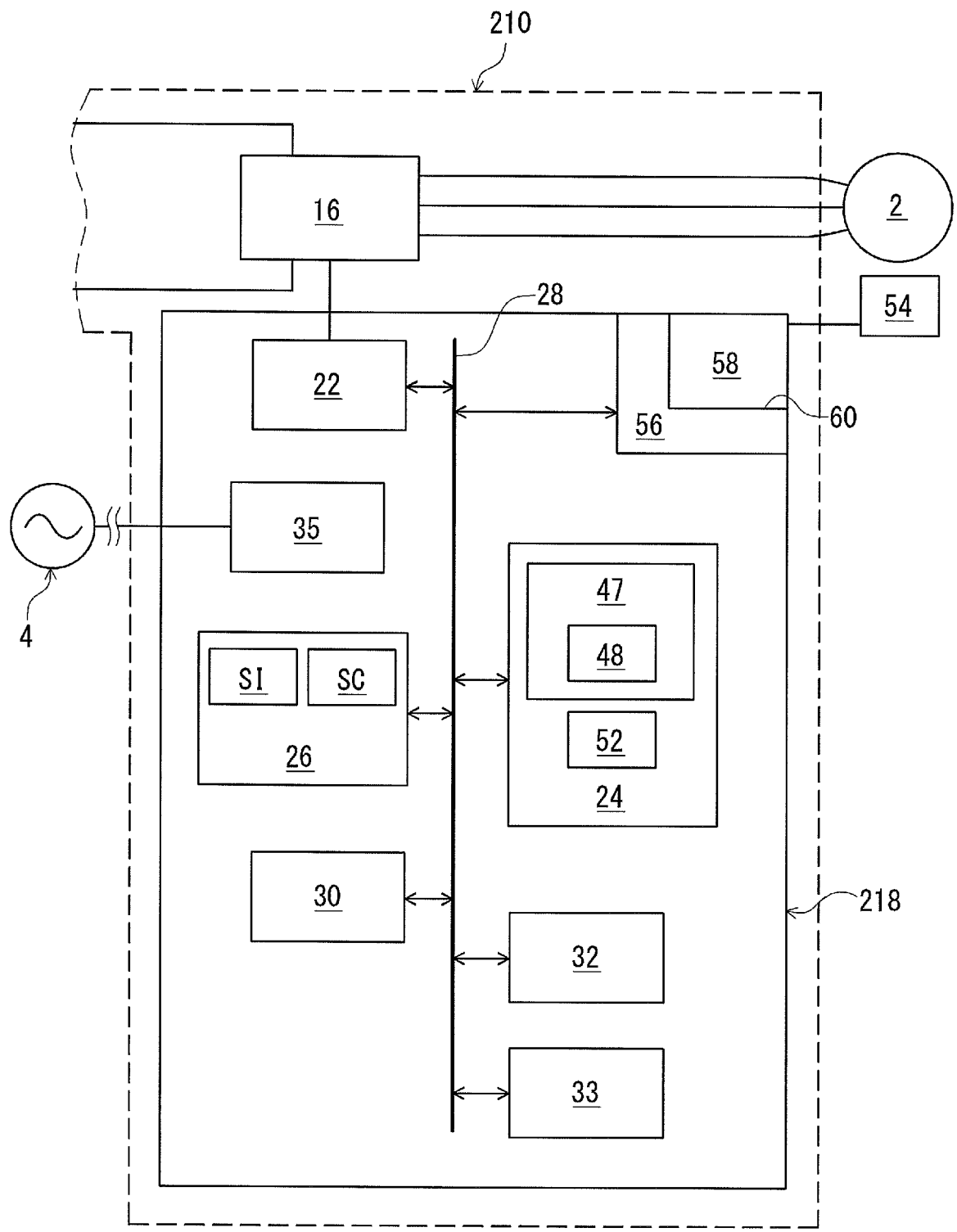
FIG. 32 is a schematic block diagram of a motor control apparatus in accordance with a second embodiment.

As seen in FIG. 32, the motor control apparatus 210 includes an inverter controller 218. The inverter controller 218 has substantially the same structure as that of the inverter controller 18 of the first embodiment. In the motor control apparatus 210, however, the display 32 and the input device 33 are provided in the inverter controller 218, and the operation device 34 is omitted from the motor control apparatus 210. The arrangement of the components of the motor control apparatus 10 or 210 is not limited to the illustrate embodiment.

With the motor control apparatus 210, it is possible to obtain the same effects at those of the motor control apparatus 10 in accordance with the first embodiment.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A method of controlling a motor control apparatus, comprising:
   selecting one of a first option and a first additional option in a first setting item in response to a first user input via a setting sequence prior to a control-mode-finding sub-process of the setting sequence, the first setting item relating to a motor and including the first option and the first additional option, the first option being different from the first additional option;
   selecting a first control mode in the control-mode-finding sub-process via the setting sequence based on the first option selected in the first setting item prior to the control-mode-finding sub-process; and
   selecting a second control mode in the control-mode-finding sub-process via the setting sequence based on the first additional option selected in the first setting item prior to the control-mode-finding sub-process, the first control mode being different from the first option and the first additional option, and the second control mode being different from the first control mode, the first option, and the first additional option.

2. The method according to claim 1, further comprising:

selecting one of a second option and a second additional option in a second setting item in response to a second user input via the setting sequence prior to the control-mode-finding sub-process, the second setting item relating to the motor and including the second option and the second additional option, the second setting item being different from the first setting item, the second option being different from the second additional option, the first control mode being different from the second option and the second additional option, the second control mode being different from the second option and the second additional option;

selecting the first control mode in the control-mode-finding sub-process via the setting sequence based on the first option selected in the first setting item prior to the control-mode-finding sub-process, and the second option selected in the second setting item prior to the control-mode-finding sub-process; and selecting the second control mode in the control-mode-finding sub-process via the setting sequence based on the first additional option selected in the first setting item prior to the control-mode-finding sub-process, and the second option selected in the second setting item prior to the control-mode-finding sub-process.

3. The method according to claim 2, further comprising:

selecting a first additional control mode in the control-mode-finding sub-process based on the first option selected in the first setting item prior to the control-mode-finding sub-process, and the second additional option selected in the second setting item prior to the control-mode-finding sub-process, the first additional control mode being different from the first control mode, the second control mode, the first option, the first additional option, the second option, and the second additional option, and selecting a second additional control mode in the control-mode-finding sub-process based on the first additional option selected in the first setting item prior to the control-mode-finding sub-process, and the second additional option selected in the second setting item prior to the control-mode-finding sub-process, the second additional control mode being different from the first control mode, the second control mode, the first additional control mode, the first option, the first additional option, the second option, and the second additional option.

4. The method according to claim 2, further comprising:

selecting one of a third option and a third additional option in a third setting item in response to a third user input via the setting sequence prior to the control-mode-finding sub-process, the third setting item relating to the motor and including the third option and the third additional option, the third setting item being different from the first setting item and the second setting item, the third option being different from the third additional option;

selecting the first control mode in the control-mode-finding sub-process based on the first option selected in the first setting item prior to the control-mode-finding sub-process, the second option selected in the second setting item prior to the control-mode-finding sub-process, and the third option selected in the third setting item prior to the control-mode-finding sub-process;

selecting the second control mode in the control-mode-finding sub-process based on the first additional option selected in the first setting item prior to the control-mode-finding sub-process, the second option selected in the second setting item prior to the control-mode-finding sub-process, and the third option selected in the third setting item prior to the control-mode-finding sub-process; and selecting a third control mode in the control-mode-finding sub-process based on the first option selected in the first setting item prior to the control-mode-finding sub-process, the second option selected in the second setting item prior to the control-mode-finding sub-process, and the third additional option selected in the third setting item prior to the control-mode-finding sub-process, the third control mode being different from the first option, the first additional option, the second option, the second additional option, the third option, and the third additional option.

5. The method according to claim 4, further comprising selecting a fourth control mode in the control-mode-finding sub-process based on the first additional option selected in the first setting item prior to the control-mode-finding sub-process, the second option selected in the second setting item prior to the control-mode-finding sub-process, and the third additional option selected in the third setting item prior to the control-mode-finding sub-process, wherein the fourth control mode is different from the third control mode, the first option, the first additional option, the second option, the second additional option, the third option, and the third additional option.

6. The method according to claim 4, wherein the selecting of one of the third option and the third additional option is executed via the setting sequence before the selecting of one of the second option and the second additional option.

7. The method according to claim 6, wherein the selecting of one of the third option and the third additional option is executed via the setting sequence before the selecting of one of the first option and the first additional option.

8. The method according to claim 7, wherein the selecting of one of the first option and the first additional option is executed via the setting sequence before the selecting of one of the second option and the second additional option.

* * * * *